US012371256B2

(12) United States Patent
Kütt et al.

(10) Patent No.: US 12,371,256 B2
(45) Date of Patent: Jul. 29, 2025

(54) DOUBLE SIDED AUTOMATED PARCEL TERMINAL

(71) Applicant: Cleveron AS, Viljandi (EE)

(72) Inventors: Arno Kütt, Viljandi parish (EE); Ott Pabut, Tallinn (EE); Remi Lõssov, Viljandi (EE); Anu Koppel, Viljandi (EE); Indrek Pettai, Viljandi parish (EE); Karel Tops, Elva (EE); Rein Saetalu, Põhja-Sakala parish (EE); Maldur Mäkler, Viljandi (EE)

(73) Assignee: Cleveron AS, Viljandi (EE)

( * ) Notice: Subject to any disclaimer, the term of this patent is extended or adjusted under 35 U.S.C. 154(b) by 954 days.

(21) Appl. No.: 17/477,787

(22) Filed: Sep. 17, 2021

(65) Prior Publication Data

US 2022/0081211 A1 Mar. 17, 2022

Related U.S. Application Data

(60) Provisional application No. 63/079,693, filed on Sep. 17, 2020.

(51) Int. Cl.
*B65G 1/04* (2006.01)
*B65G 1/137* (2006.01)
*G07F 11/42* (2006.01)

(52) U.S. Cl.
CPC ......... *B65G 1/0407* (2013.01); *B65G 1/0428* (2013.01); *B65G 1/0435* (2013.01); *B65G 1/1373* (2013.01); *G07F 11/42* (2013.01)

(58) Field of Classification Search
CPC .. B65G 1/0407; B65G 1/0428; B65G 1/0435; B65G 1/1373; B65G 2201/0285; G07F 11/42; G07F 11/165; G07F 17/12; G07F 17/13; G06Q 20/18
USPC ........................... 414/280; 221/13; 211/59.3
See application file for complete search history.

(56) References Cited

U.S. PATENT DOCUMENTS

| | | | | |
|---|---|---|---|---|
| 5,213,463 A | * | 5/1993 | Rothlisberger | B65G 1/0435 414/280 |
| 5,540,532 A | * | 7/1996 | Carder | B65G 1/0407 414/284 |
| 6,923,612 B2 | * | 8/2005 | Hansl | B65G 1/0435 414/280 |
| 8,721,251 B1 | * | 5/2014 | Razumov | B65G 1/0492 414/281 |
| 9,242,810 B2 | | 1/2016 | Lõssov et al. | |

(Continued)

FOREIGN PATENT DOCUMENTS

| CN | 206714044 U | 12/2017 |
|---|---|---|
| CN | 108502246 B | 4/2020 |

(Continued)

*Primary Examiner* — Thomas Randazzo
(74) *Attorney, Agent, or Firm* — Koivula & Somersalo, LLC

(57) ABSTRACT

An automated parcel terminal having one or more entry and retrieval points is disclosed. The terminal has a lift cage and a loader that allows moving specifically designed trays to and from shelf columns on two sides of the lift cage. The lift and loader assembly allows the loader to serve multiple shelf columns in the terminal. The loader has a back cover configured to protect the users from moving parts of the terminal, but also to support trays in a shelf column while the loader pulls one tray out from the shelf column.

13 Claims, 17 Drawing Sheets

(56) References Cited

U.S. PATENT DOCUMENTS

| | | | |
|---|---|---|---|
| 9,604,259 B2 | 3/2017 | Lossov et al. | |
| 10,114,996 B2 | 10/2018 | Lossov et al. | |
| 11,897,695 B2 * | 2/2024 | Ma | G07F 11/42 |
| 2005/0232730 A1 * | 10/2005 | Kantola | B65G 1/0435 |
| | | | 414/280 |
| 2006/0276930 A1 * | 12/2006 | Tsujimoto | B65G 1/0492 |
| | | | 700/214 |
| 2010/0280655 A1 * | 11/2010 | Wilson | G07F 11/42 |
| | | | 211/59.3 |
| 2011/0020098 A1 * | 1/2011 | Pfaffmann | B65G 1/0421 |
| | | | 414/807 |
| 2012/0285980 A1 * | 11/2012 | Busto | G07F 11/24 |
| | | | 221/13 |
| 2016/0280472 A1 | 9/2016 | Porat et al. | |
| 2019/0031441 A1 * | 1/2019 | Jin | G07F 11/58 |
| 2019/0220815 A1 * | 7/2019 | Nelson | H04W 4/14 |
| 2019/0352092 A1 | 11/2019 | Zheng et al. | |
| 2020/0009616 A1 | 1/2020 | Li et al. | |
| 2020/0062502 A1 | 2/2020 | Kütt et al. | |

FOREIGN PATENT DOCUMENTS

| | | | | |
|---|---|---|---|---|
| EP | 3453252 A1 | | 3/2019 | |
| GB | 2512867 A | * | 10/2014 | G07F 11/165 |
| JP | 2012210185 A | | 11/2012 | |
| JP | 2015195786 A | | 11/2015 | |
| JP | 2015223082 A | | 12/2015 | |

* cited by examiner

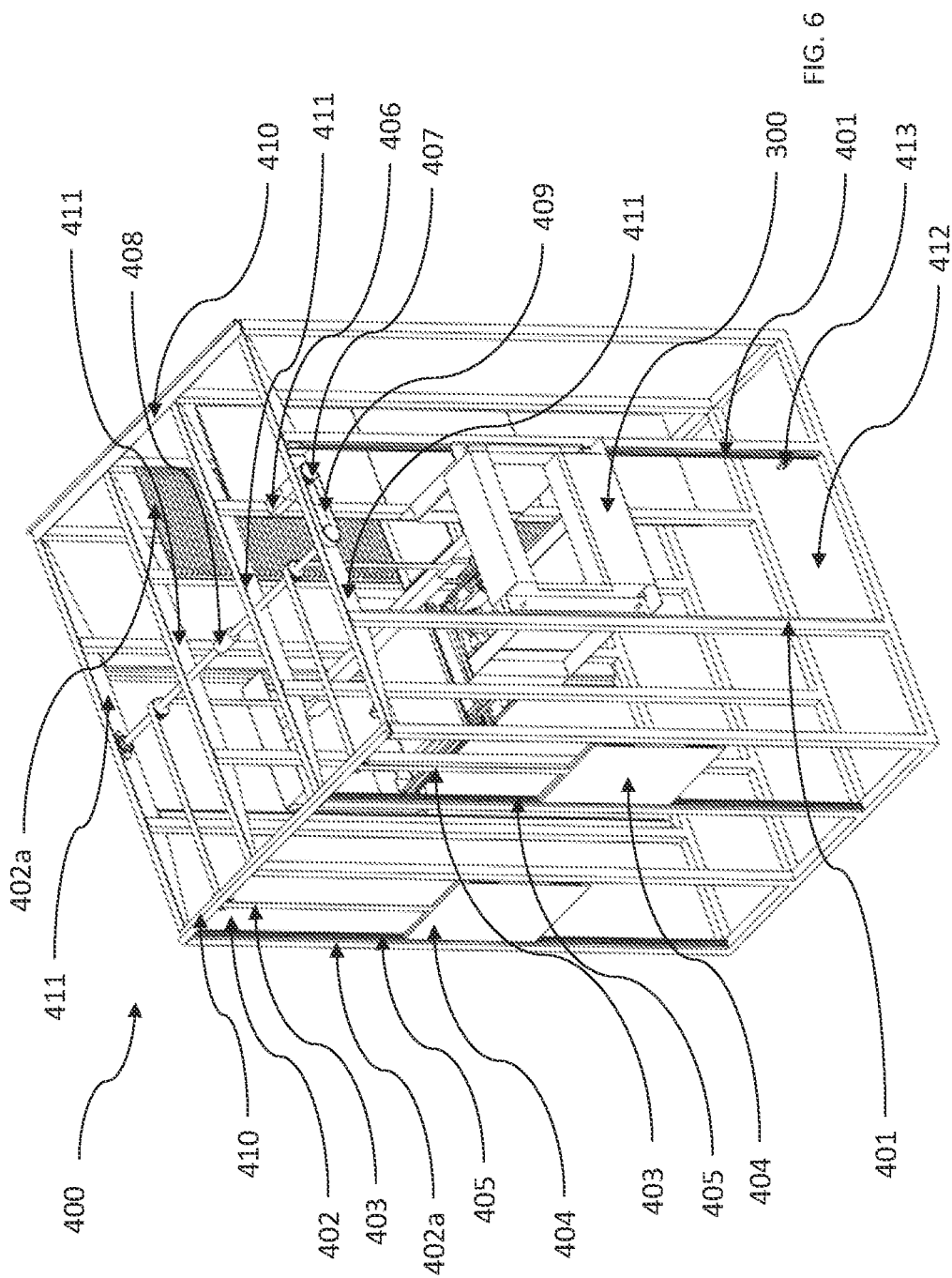

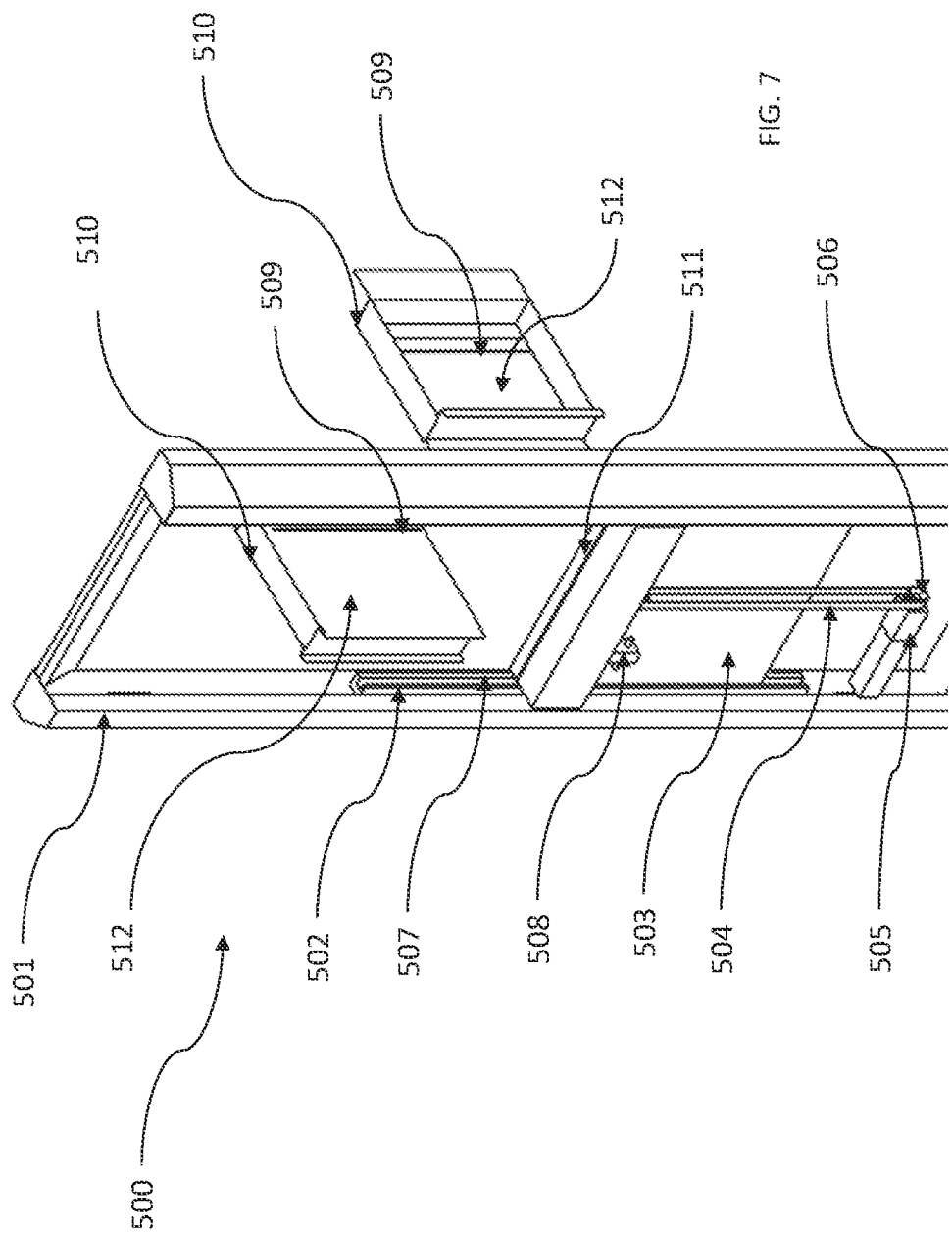

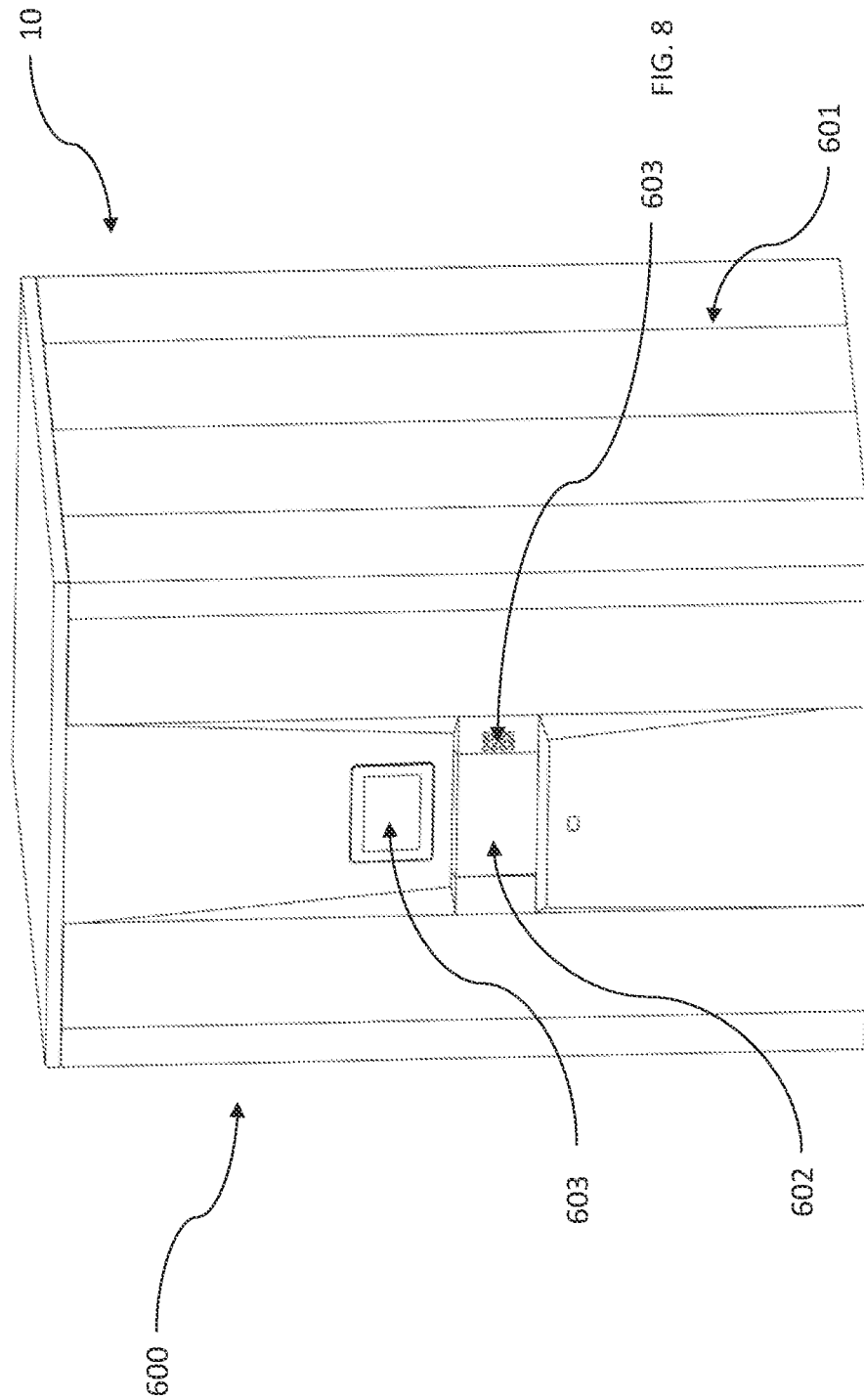

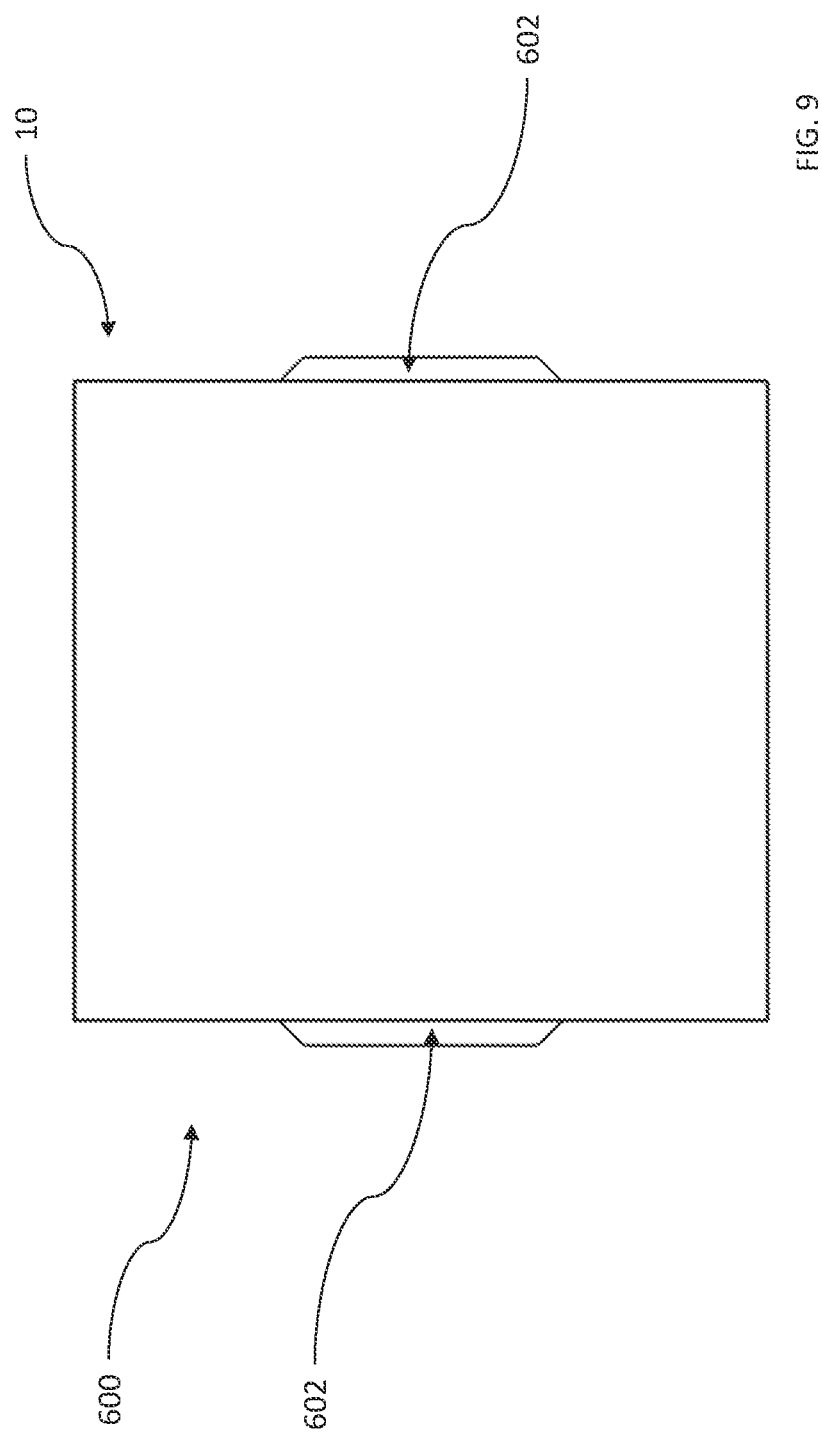

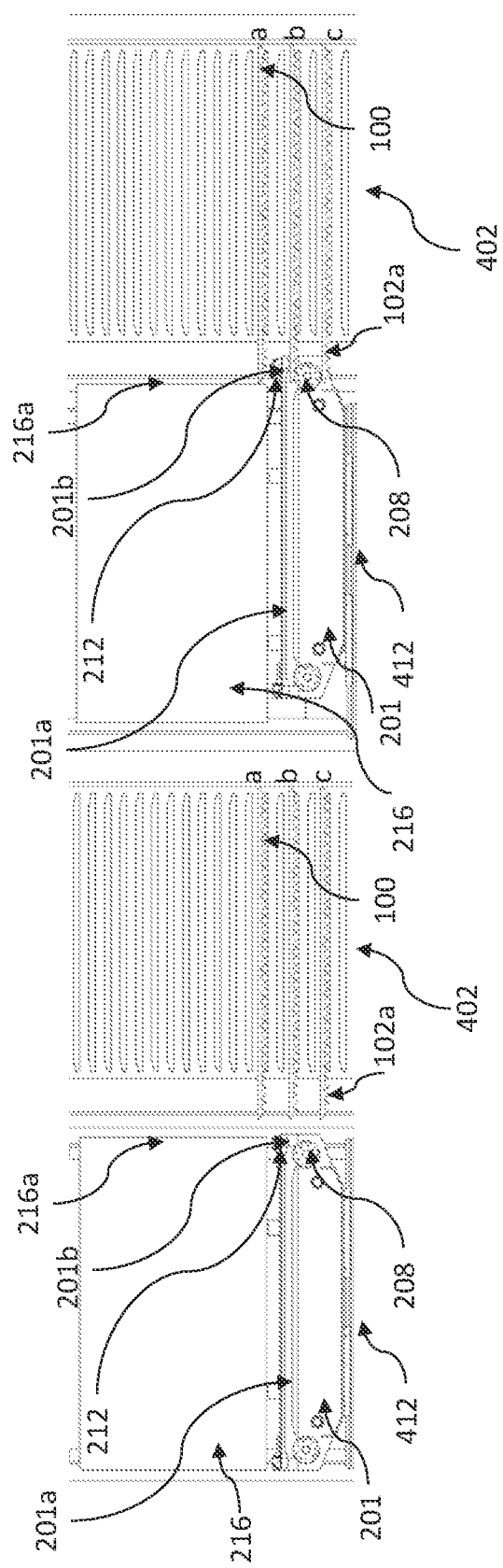

A DOUBLE SIDED AUTOMATED PARCEL TERMINAL

PRIORITY

This utility patent application I claims priority of U.S. provisional application No. 63/079,693 filed on Sep. 17, 2020, the contents of which is incorporated herein by reference.

FIELD OF THE INVENTION

This invention relates to the field of self-service parcel terminals, more specifically to the field of methods for delivery, sending, receiving, and storing parcels, packages, mail, and other postal objects.

BACKGROUND OF THE INVENTION

As ordering merchandise online is becoming more and more common there is an increasing need for various solutions for vendors to distribute the orders. Several different automated parcel terminals are known in the art. Generally, the terminals have one entry point where the vendors/couriers fill the terminals, and the customers pick up their orders. The terminals known in the art may be locker-type of terminals, such as disclosed in U.S. Pat. No. 9,604,259. In a locker-type of terminals there are no moving parts, but the orders are deposited to separate locker compartments. Other known systems include moving lift structures that deposit orders into predetermined positions in the terminal. U.S. Pat. No. 10,114,996 discloses a tower-like terminal where a vertically moving lift structure includes a mast connected to a rotating plate. US2020/0062502 provides another solution where the vertically moving lift structure includes a mast that is moving along rails inside the terminal. All of these solutions thus either are stationary locker type of solutions or they include a lift system that includes a moving mast. U.S. Pat. No. 9,242,810 discloses a terminal where a lift system includes a loader moving vertically along a stationary mast. All of these systems provide terminals that have one entry point only. U.S. Pat. No. 9,604,259 provides a system with multiple entry points, but the system again includes at least one lift structure with a moving mast. Accordingly, there is a need for a simplified terminal system that would allow multiple entry points to ease the distribution of customer orders. Furthermore, there is a need for a terminal that could be affordable and practical for smaller vendors and also could provide an alternative to locker type of terminals that are currently in wide use.

SUMMARY OF THE INVENTION

It is an object of this disclosure to provide solutions to the above-mentioned needs and more.

It is an object of this invention to provide an automated parcel terminal comprising:
  at least one shelf row parallel to a wall of the terminal, the shelf row comprising multiple shelf columns;
  at least one retrieval and entry point preferably on a wall perpendicular to at least one shelf row;
  a lift cage configured to move vertically in front of the at least one shelf row, controlled by a lift-motor, lift driving belt, pulleys, and counterweights, and having a width equaling to a width of at least one shelf column;
  a loader positioned in the lift cage on a movable extender plate and having at least one open end facing toward the at least one shelf row;
  the loader being configured to move sideways within the lift cage through operation of a positioner comprising a positioner motor, a positioner timing belt, and a positioner drive pulley, such that the loader can be positioned in front of a predetermined shelf column;
  the extender plate configured to move the loader toward the predetermined shelf column such that the loader can push/pull a tray to/from the predetermined shelf column via a connection between toothed engagement racks in bottom side of the tray and toothed loading rollers located at the open ends of the loader.

According to certain embodiments the automated parcel terminal has two parallel shelf rows and the lift cage has a width of three shelf columns and is located in a corridor in between the shelf rows, and the loader is configured to serve three shelf columns in each shelf row. Thus, the loader is moving sideways within the lift case such that it has three positions, each for serving one shelf column.

According to certain embodiments the lift cage has a width of two shelf columns, and the loader is configured to serve two shelf columns in each shelf row. Thus, the loader is moving sideways within the lift case such that it has two positions, each for serving one shelf column.

According to certain embodiments the automated parcel terminal has two retrieval and entry points on opposite walls of the terminal at the ends of the corridor between the shelf rows.

According to certain embodiments the automated parcel terminal has one retrieval and entry point. Retrieval and entry point comprises at least an external console and a user interface.

According to certain embodiments the automated parcel terminal has a loader with a vertical back cover perpendicularly positioned against the direction of at least one shelf row, and the back cover is configured to form a barrier for a user to reach beyond a tray on the loader.

According to certain embodiments the edges of the back cover are configured to support and push back one or more trays located in the shelf column above the tray that is being pulled out onto the loader.

According to certain embodiments the support and push back feature of the back cover is realized by springs that allow the back cover to move horizontally when the loader reaches the tray to be pulled out from the shelf column.

According to certain embodiments the support and push back feature for the back cover is stationary and the support and push back feature is realized by providing a back cover that has a back cover edge and a back cover protection edge.

It is an object of the invention to provide a method to fulfill online product orders, the method comprising: providing an automated parcel terminal having at least two shelf rows parallel to a wall of the terminal, the shelf rows comprising multiple shelf columns; two retrieval and entry points preferably on the walls perpendicular to the shelf rows; a lift cage configured to move vertically in front of the shelf rows, controlled by a lift-motor, lift driving belt, pulleys, and counterweights, and having a width equaling with at least one, preferably more than one, and most preferably with three shelf columns; a loader positioned in the lift cage on an movable extender plate and having two open ends facing toward the shelf rows; the loader being configured to move sideways within the lift cage through operation of a positioner and a positioner belt such that the loader can be positioned in front of a predetermined shelf column; the extender plate configured to move the loader toward the predetermined shelf column, such that the loader can push/pull a tray to/from the predetermined shelf column via a connection between toothed engagement racks in bottom side of the tray and toothed loading rollers located at the open ends of the loader; installing the terminal such that one of the entry and retrieval points is used for filling orders into the terminal, and the other entry and retrieval point is used for receiving orders from the terminal; a vendor receiving an order from a customer; the vendor or a courier filling the ordered items into the terminal via the entry and retrieval point for filling orders; the automated parcel terminal communicating via a server to the customer of the order being available in the terminal; the user identifying him/herself at a user interface of the terminal entry and retrieval point for receiving orders; and the terminal retrieving the order and delivering it to the customer entry and retrieval point.

It is another object of the invention to provide a lift and loader-assembly for an automated parcel terminal comprising: a lift cage having two vertical end structures connected by at least two horizontal elements, the lift cage configured to move vertically in front of shelf columns of the automated parcel terminal; a positioner time belt running between the vertical end structures on bottom of the lift cage, the positioner time belt being attached to an extender plate supporting a loader and configured to move the extender plate and the loader horizontally within the lift cage between the two vertical end structures such that the loader becomes positioned in front of a shelf column to be served; the loader comprising a loader main structure, two loading shafts connected by a loading belt, the loading shafts connected from each of their ends to a loading gear system configured to roll loading rollers having toothed profile compatible with a toothing of engagement rack underneath a tray; and the extender plate configured to move the loader toward the shelf column such that the loading rollers engage with the engagement rack of a tray for pulling the tray onto the loader.

According to certain embodiments in the lift and loader-assembly the loader has a vertical back cover positioned parallel with the vertical end structures and located on one side of the loader main structure.

According to certain embodiments in the lift and loader-assembly the back cover is attached on a back cover support and it is lineated with the edges of the main structure of the loader when no external force is applied, but is moving horizontally due to compression springs when an edge of the back cover becomes in touch with trays in a shelf column.

According to certain embodiments in the lift and loader-assembly the back cover is stationary attached on a back cover support and the back cover has a back cover edge and a back cover protection edge. The back cover edge is located closer to the center of the loader than the back cover protection edge and prevents movement of one or more of the trays located on the shelf above the tray intended to be loaded on the loader, while the back cover protection edge extends along a side of the trays and enables loading rollers coming in contact with the toothed engagement rack and start the loading procedure.

BRIEF DESCRIPTION OF THE FIGURES

FIG. 6 illustrates internal structure (400) of the parcel terminal of this invention. The figure shows the lift rails (401), shelf columns (402) with shelf support (402a), lift belts (403), counterweights (404) and counterweight rails (405). Lift motor (406), drive pulley (407), endless timing belt (loop) (409) and lifting shaft system (408) are shown. The figure also shows a ceiling profile (410) shaft support (411), a loading area (412), and lift home sensor (413).

FIG. 7 shows structure of the internal console (500). The figure shows support structure (501), light curtains (502), console sliding door (503), door belt (504), door motor (505), and pulley system (506). The figure also shows guide rails (507), door home sensor (508), vertical measurement curtains (509), optical sensors (510), and a counter (511).

FIG. 8 shows outer shell (600) of the parcel terminal (10). The figure shows the sheet panels (601), an external console (602) and user interface (603). According to a preferred embodiment a similar external console is located on the opposite side of the terminal.

FIG. 9 shows an embodiment of the parcel terminal (10) with two external consoles (602) on opposite sides of the terminal.

FIGS. 10A, B, C, and D illustrate insertion of a tray (100) from a shelf column (402) to the loader. The figure is a side view of the system facing toward the loading area (412). Shown are the main structure of the loader (201), the guide rails (201a), guide rail grooves (201b), loading rollers (208) engaging with the engagement racks (102a) of the trays, optical sensors (212), back cover (216) and back cover edges (216a). In the figure three trays (a, b, c) are shown in the shelf column. In FIG. 10A the loader is not in contact with the trays in the shelf column. In FIG. 10B the loader has moved to proximity of the shelf column and the teeth of the loading rollers (208) at one end of the loader engage with the teeth of the engagement rack 102(a) of the tray (b) that is at a suitable level in the shelf column. The tray (a) that is above the tray (b) that is engaged with the roller touches edge of the back cover 216a. This engagement with the end of a tray and the edge of the back cover is strong enough to support the tray and keep it in its place while the tray underneath it is pulled onto the loader. In FIG. 10C the rollers (208) in contact with the engagement rack have pulled the tray (b) all the way onto the loader, while the tray (a) above the now empty space in the column is still in contact with the edge of the back cover 216a. In FIG. 10D the loader has moved away from the shelf column with the tray (b) on the loader, while trays (a) and (c) remain on the shelf column.

DETAILED DESCRIPTION OF THE INVENTION

Figure 1:
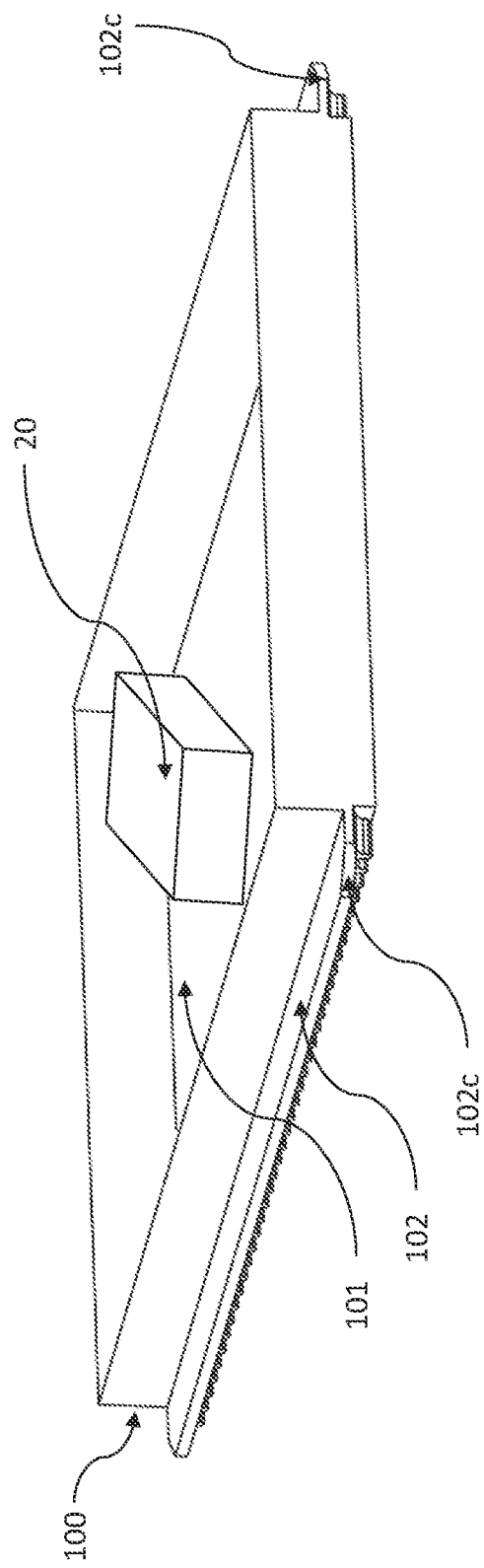
FIG. 1 illustrates the tray (100) used in the parcel terminal of this disclosure. The tray is shown to have a tray base (101), tray side extensions (102) having tapered ends (102c). A parcel or package 20 is inserted onto the tray.

An automated self-service parcel terminal for the storage and handover of online orders and direct procurements for indoor and outdoor locations is disclosed. The parcel terminal according to this invention comprises an outer shell (600), at least one external console (602), at least one internal console (500), a lift cage (300), a loader (200), an internal structure (400) comprising a multitude of shelf columns (402) for storing items of different sizes in specifically designed parcel trays (100). The parcel trays are configured to be pulled out from the shelf columns by means of a matching toothing of loading rollers (208) and toothing of engagement racks (102a) on the lower side of the trays. The terminal preferably has two console structures (comprising an external and internal console) on opposite sides of the terminal so that one console structure can be used for a vendor/courier to fill the terminal and the other console structure for users to pick up orders. The lift and loader are configured such that the parcel trays can be moved from opposite shelf columns to either one of the console structures as needed. According to other preferred embodiments, the two console structures can be located on adjacent walls of the terminal. According to certain embodiments the terminal may only have one console structure. It is possible to have more than two console structures as well.

The construction of the parcel terminal of this disclosure addresses several shortcomings of previous art. This disclosure provides a terminal which can feature more than one entry and retrieval point, preferably two entry and retrieval points. An entry and retrieval point comprises an external console which forms the access point for a person inserting or retrieving a package, and an internal console which refers to the space in which the package is delivered inside the terminal and into which space the user has access via the external console. Two entry and retrieval points enable placing one of the entry points in a customer area and one in the warehouse area, thus reducing the logistic chain of transporting the parcel from warehouse to the front side of the parcel terminal. In an alternative embodiment one entry point of the parcel terminal can be directed to outdoor while other one is inside the warehouse, thus providing comfortable infrastructure for loading parcels from inside the warehouse, and an all-time access to customers for retrieving the parcels from outside. This feature is mainly enabled by the novel loader and extender system, which can load the parcel trays from shelf columns at either side of the loader and to deliver the trays to either one of the two entry and retrieval points. The entry and retrieval points can be located at any one of the four sides of the parcel terminal, although in a preferred embodiment the entry and retrieval points are on opposite sides of the terminal as is illustrated in FIG. 8. Terminal is automated and controlled by a computer system which is connected to a server to retrieve and send information of retrieval, pickup and location of the parcels.

Parcel Tray

The self-service parcel terminal (10) uses specifically designed parcel trays (100) to store different sized goods or parcels (20) and move them within the terminal as required. The usage of trays allows to store goods of various ambiguous shapes without imposing strict requirements on their packaging. The tray comprises a tray base (101) for storing goods. The tray has tray side extensions (102) on two opposite sides of the tray configured to hold the trays in shelf columns for storing and to facilitate movement of trays to and from the loader. The tray can be made of different materials such as but not limited to plastics, composites, or aluminum. In an alternative embodiment the tray may be also manufactured from several pieces and different materials; for example, the tray base can be made of steel sheets and sides and side extensions from injection molded thermoplastics.

Figure 2:
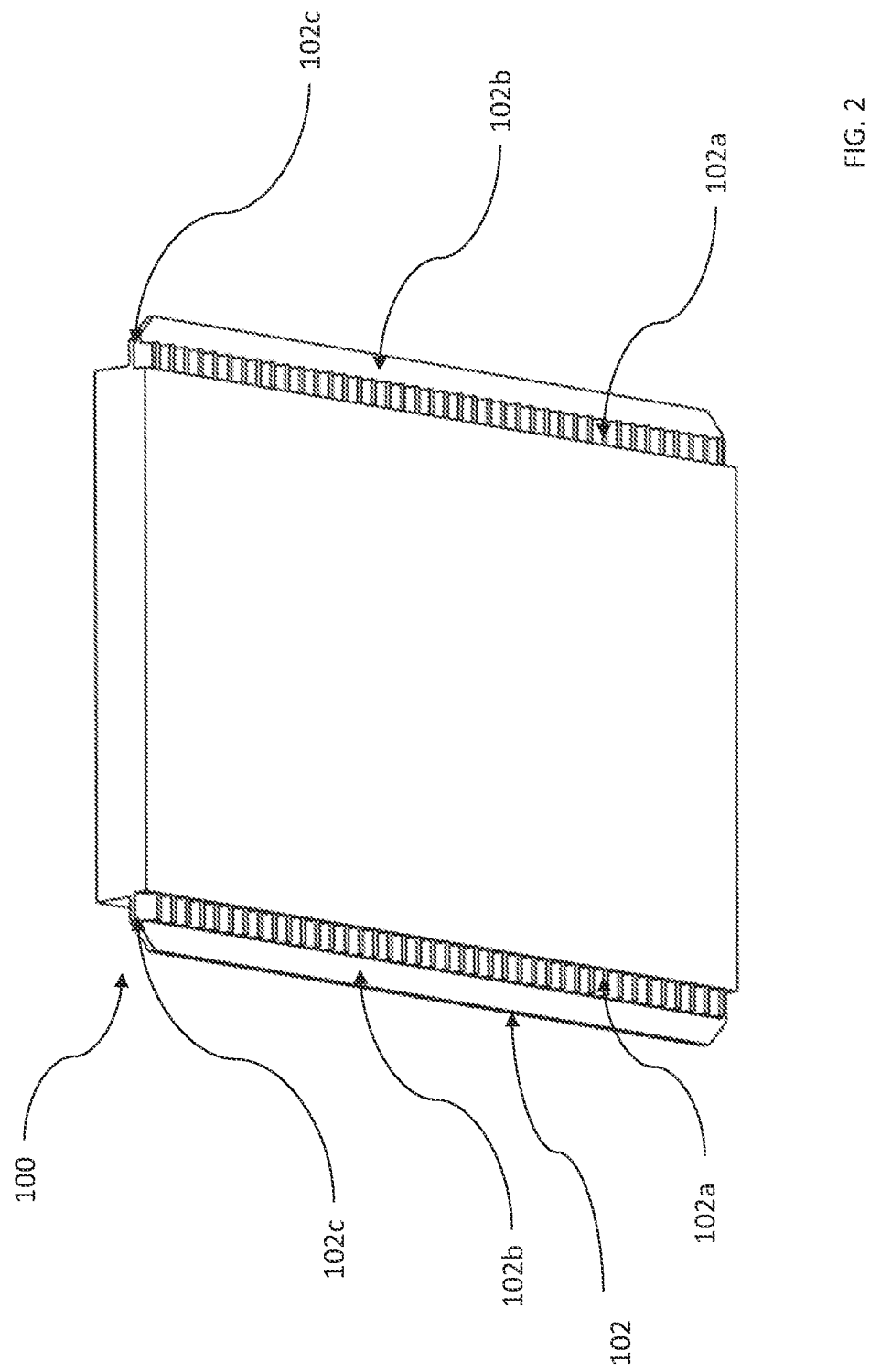
FIG. 2 shows the lower side of the tray (100). Shown are tray side extensions (102) having tapered ends (102c). Engagement racks (102a) with toothed profiles are shown located in this embodiment underneath the tray side extensions. The lower surface of the tray side extension also forms a support surface (102b).

As is illustrated in FIGS. 1 and 2, the tray generally has four sides, and two parallel sides have the tray side extensions (102). Preferably underneath the tray side extensions (102) there are toothed engagement racks (102a) running parallel to each other throughout the length of the tray. In certain embodiments the engagement racks may have different lengths, or they may locate differently. The tray side extensions also comprise a support surface (102b). The engagement rack is used to move the trays into and out from shelf columns in the terminal. The toothed rack profile enables very high precision of the movements. The support surfaces (102b) locate above the engagement rack and they extend further outward than the engagement racks. The support surfaces are used for supporting the trays once they are placed into the shelf columns between the shelf supports. The support surfaces also support the trays when they are placed onto the loader and also, they are configured to guide the trays (100) during the movement process from loader to shelf columns and vice versa. The support surfaces (102b)

have tapered ends (102c) at both of their ends to guide the parcel tray onto the loader while it is being pulled from the shelf column.

Loader

Figure 3A:
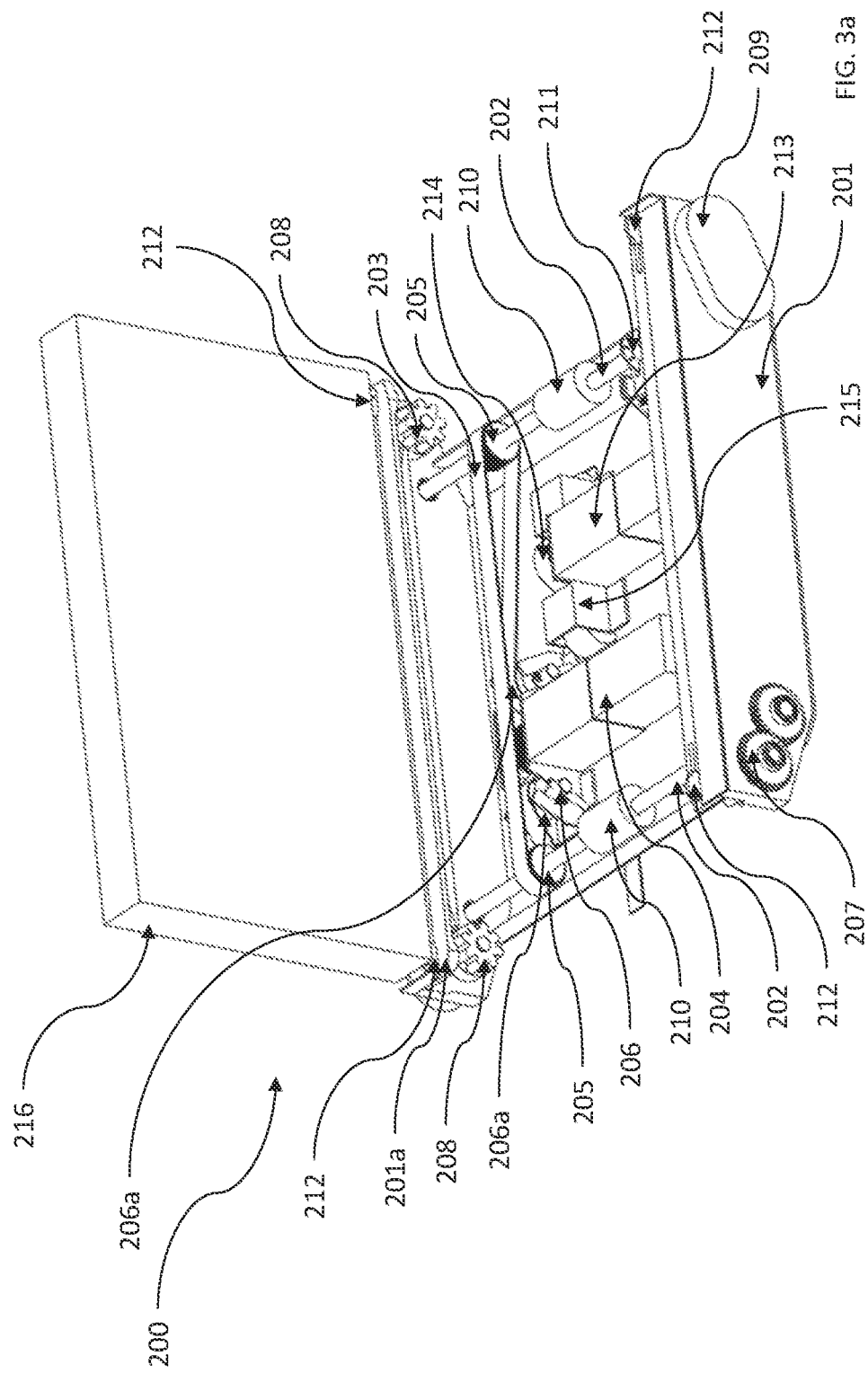
FIG. 3a illustrates the loader (200) of this invention. The figure shows a guiderail (201a), the main structure of the loader (201), the loading shafts (202), the loading belt (203), the loading motor (204), the timing pulleys (205), the belt adjustment system (206), the omega drive idler (206a), a gear system (207), the loading rollers (208), a gear cover (209) covering a gear system, the clutches (210), the encoder system (211), optical sensors (212), the extender motor (213), the extender timing belt (214), the belt pre-stress system (215), and the back cover (216).

Referring now to FIGS. 3a, b and 4, the loader (200) is built upon its main structure (201), which acts as a connection point for all other parts of the loader. The main structure incorporates a pair of guide rails (201a) on which the parcel tray (100) can slide. Alternatively, the guide rails can be of different material and separately attached onto the main structure. Two pairs of loading shafts (202) are housed in the main structure (210) and connected to each other through a loading belt (203). The loading belt is used to apply torque from the loading motor (204) to both of the shafts and to synchronize the movement of the shafts through timing pulleys (205). The loading belt runs through a belt adjustment system (206), which uses an omega type belt routing to ensure maximum number of belt teeth connecting to the drive wheel. Both omega drive idlers (206a) are adjustable in two axes to ensure the drive belt runs as linear as possible along its entire length.

The ends of the loading shafts (202) are connected to a gear system (207) which transfers the torque further onto toothed loading rollers (208) at both open ends of the loader on both sides of the main structure of the loader—thus there are two loading rollers on both sides of the main structure. These toothed rollers are configured to engage with the toothed engagement racks (102a) of the parcel trays (100) and therefore facilitate movement of the trays once they come into contact with the engagement rack (102b) (see FIGS. 10A-D). The gear systems (207) are housed in gear covers (209), which protect the gears from debris and dust and acts as an additional support point for loading shafts (202).

The size and profile of the loading rollers (208) is chosen to provide optimal torque to speed ratio and also to minimize mechanical noise when in contact with the tray. Furthermore, the engagement racks of the tray and the profile of the loading rollers are designed in a manner that enables to compensate for manufacturing and assembly inaccuracies. In one alternative embodiment the loading rollers are equipped with additional rotating bushings to further reduce the friction between the engagement rack and loading roller. All four rollers have to be in exact synchronization with each other and this is achieved by adjusting the tangential position of shafts (202) relative to each other during initial assembly through clutches (210). In addition, the position of rollers is tangentially tied to the position of an encoder system (211), which is fixed onto one of the loading shafts (202) to record the turning angle of the loading rollers (208). Encoder is in connection and communication with a computing device of the terminal and enables the computing device to turn the loading rollers exactly the necessary amount to achieve a correct horizontal position of the parcel tray (100) when it is being moved. In one alternative embodiment, the encoder system can also be incorporated into the loading motor (204). In order to ensure maximum operational robustness of the system, the loader is also equipped with preferably two pairs of optical sensors (212). The optical sensors act as end switches for the parcel tray (100). The sensors are placed so that the parcel tray (100) blocks both of the sensor pairs when it is in a correct position. This enables to adjust the position of the parcel tray in case the system malfunctions electrically or mechanically.

Figure 5:
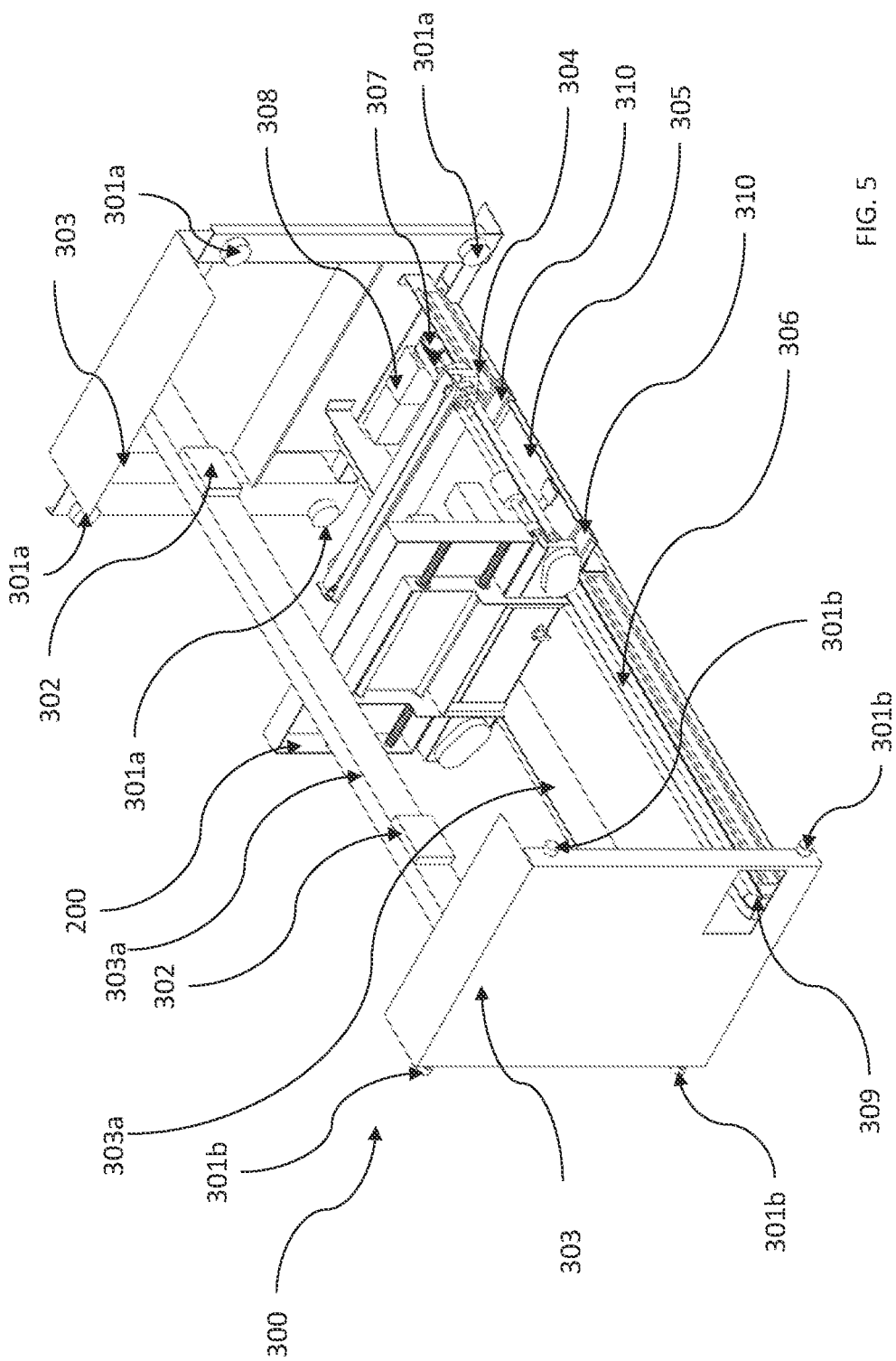
FIG. 5 illustrates the lift cage (300) according to one embodiment of this invention. The figure shows vertical lift cage structures (303) connected by horizontal lift cage elements (303a). The figure shows guide rollers (301a) and guide buffers (301b) attached to the vertical lift structures, fixing plates (302) attached to one horizontal element, and a loader position slide (304) are shown, as well as extender plate (305), positioner timing belt (306), positioner drive pulley (307), positioner motor (308), idler pulley (309), and extender sliders (310).
Figure 10:
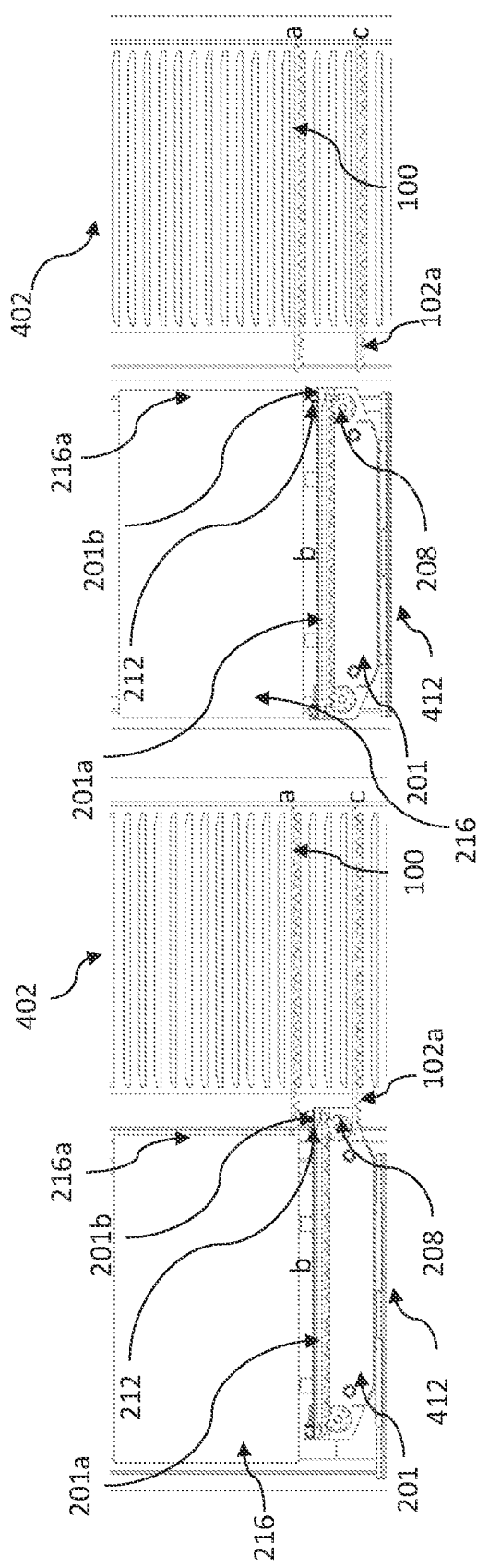
Figure 11:
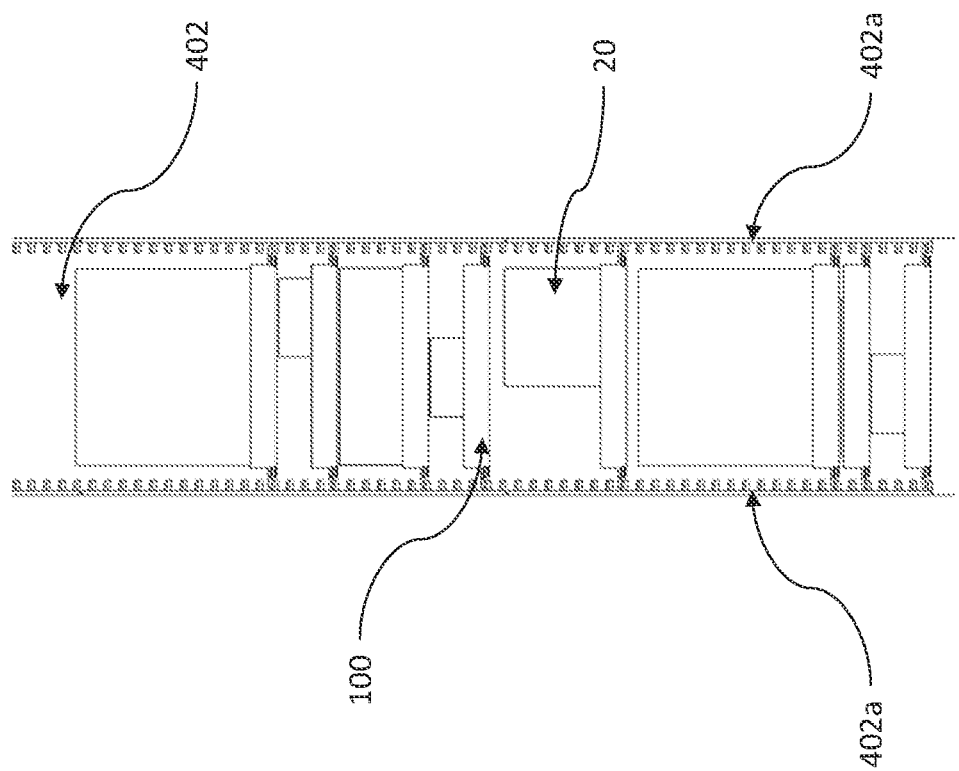
FIG. 11 is a front view of a shelf column (402) loaded with multiple trays (100) carrying parcels (20) of different sizes. The figure shows the structure of the shelf supports (402a).
Figure 12:
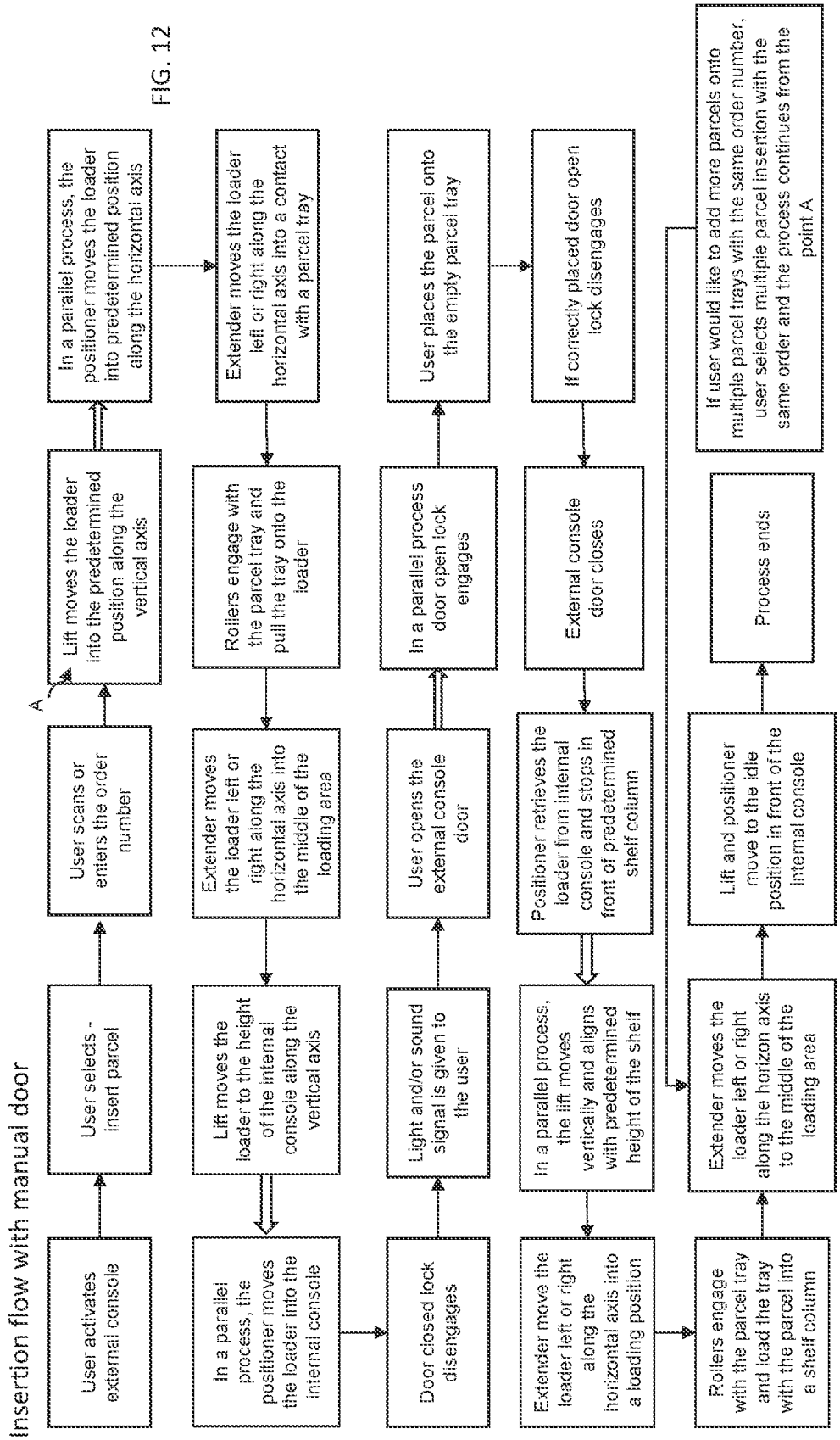
FIG. 12 is a flow chart illustrating the process of inserting a parcel into the terminal having a manually operated door.
Figure 13:
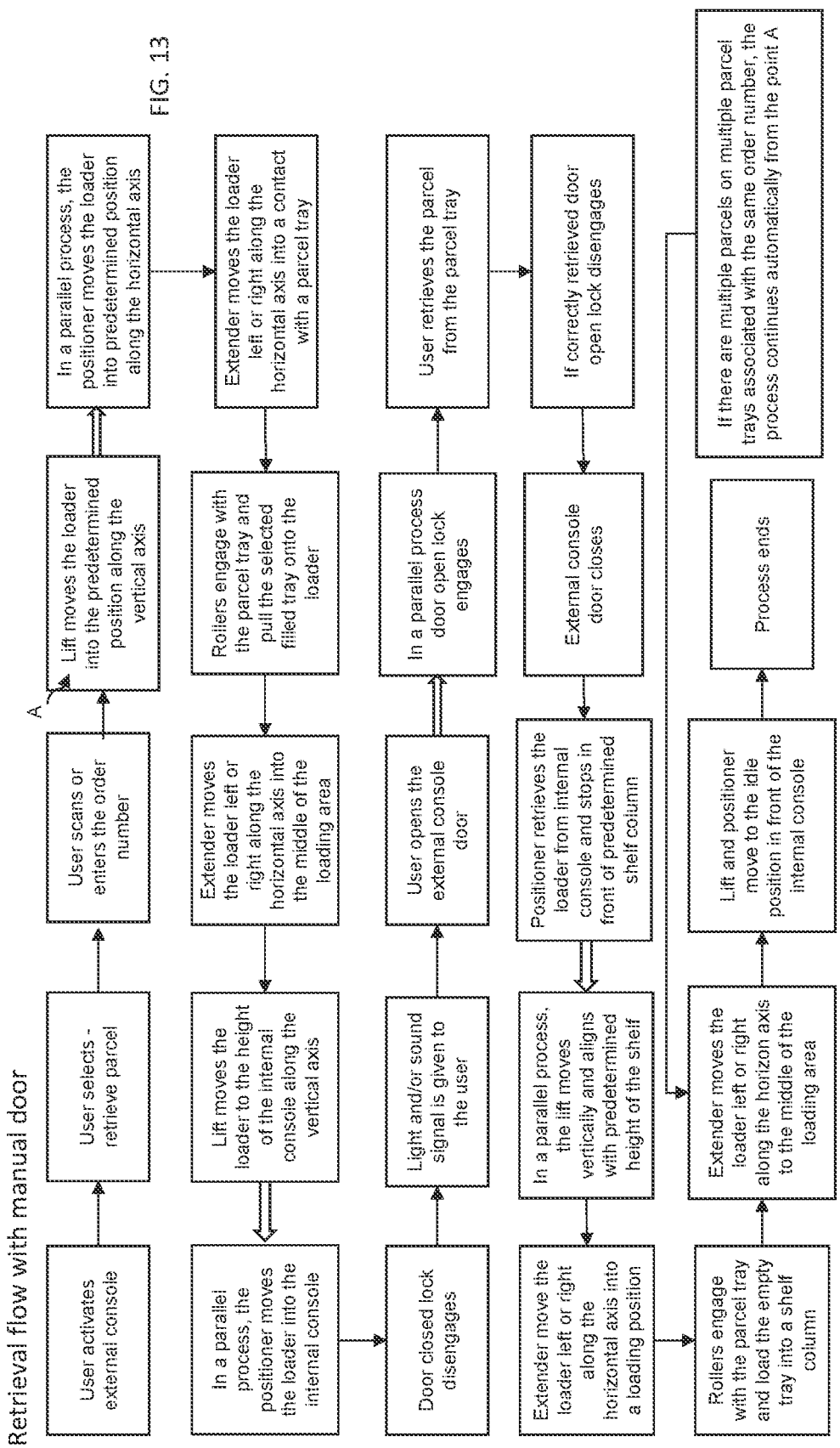
FIG. 13 is a flow chart illustrating the process of retrieving of a parcel from the terminal having a manually operated door.
Figure 14:
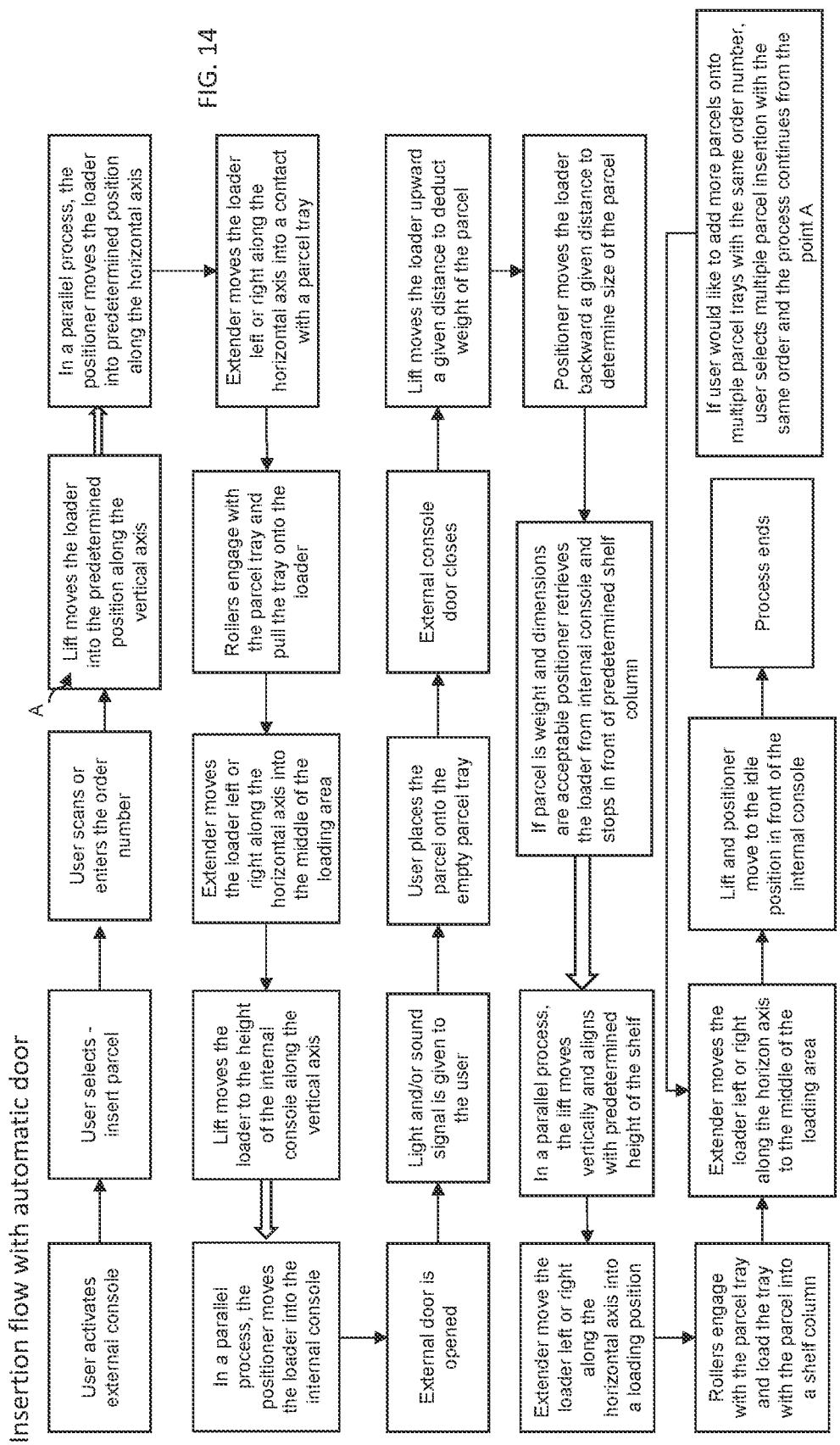
FIG. 14 is a flow chart illustrating the process of inserting a parcel into the terminal having an automatic door.
Figure 15:
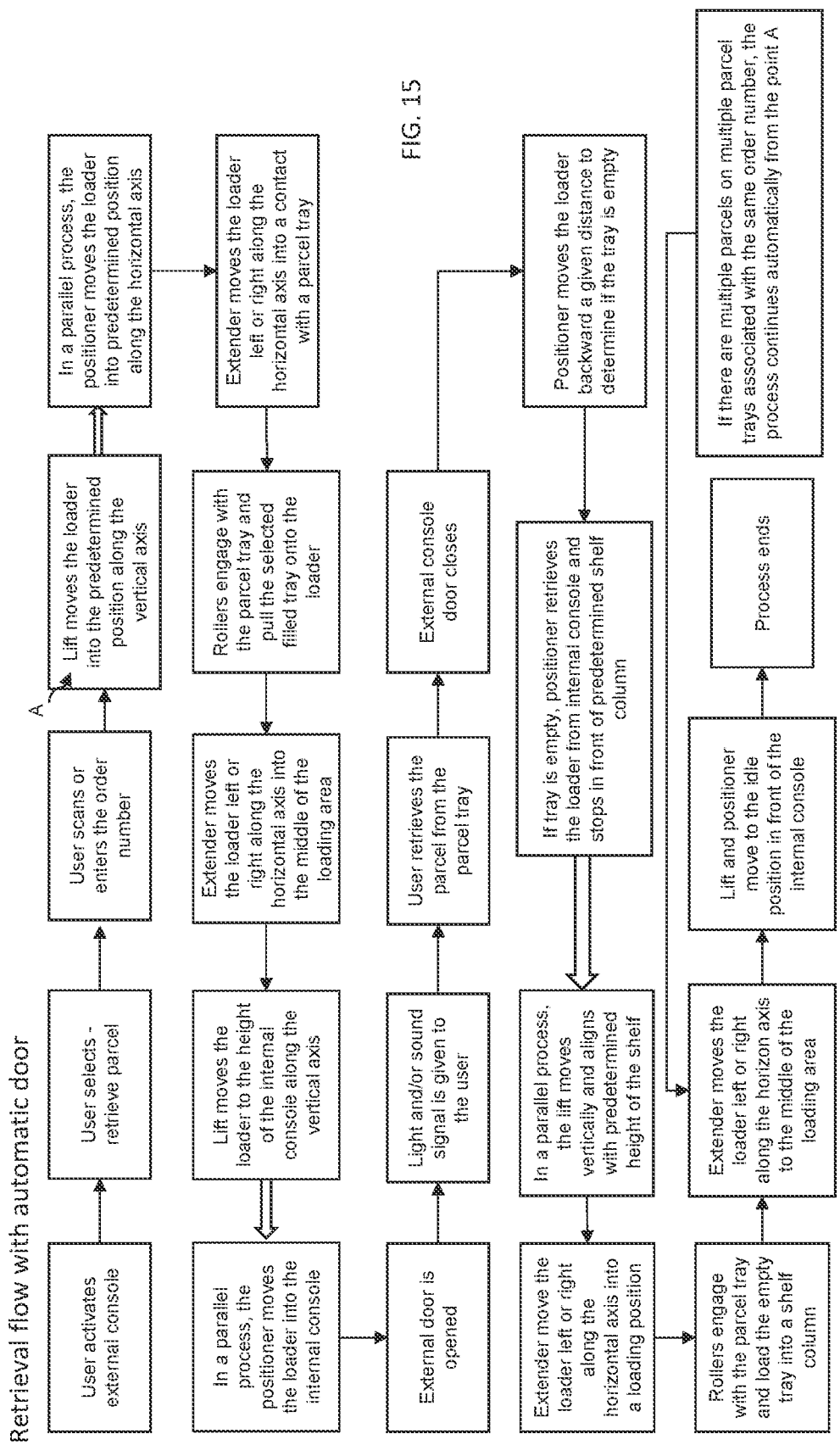
FIG. 15 is a flow chart illustrating the process of retrieving a parcel from the terminal having an automatic door.

The loader main structure (201) also supports the extender motor (213), which is used to move the loader between its two opposite loading positions on the lift cage (300) by the extender timing belt (214). The extender belt runs through a belt pre-stress system (215), which uses an omega type belt routing to ensure maximum number of belt teeth connecting to the drive wheel. The loader structure is built on an extender plate (305) as is shown in FIG. 5. The extender plate enables movement of the loader to contact the trays in tray columns.

A back cover (216) is connected to one side of the loader's main structure (201). The back cover is a vertical element rising up from the main structure of the loader and being parallel to the vertical lift cage structures (303). The back cover (216) has a dual role in the terminal: on one hand it serves as an element that protects the user from reaching into moving parts of the terminal when entering or retrieving orders from the terminal, and on the other hand the back cover is an essential element to support the trays in shelf columns while the loader is pulling a tray out or pushing a tray into a shelf column.

According to one embodiment, as is shown in FIG. 5, the loader can be at either end of the lift cage (300). The vertical lift cage structure (also called vertical end structure) (303) at the end where the loader is shown to be in FIG. 5, has an opening that allows a customer to reach to a tray that is on the loader (in FIG. 5 no tray is shown on the loader). The back cover (216) is in this case protecting the customer to reach further into the lift cage.

In another embodiment where there are two entry and retrieval points in the terminal on opposite walls of the terminal, the opposite vertical lift cage structure would allow the user to reach to tray. In this case the back cover (216) would be tiltable, movable, or it would be otherwise so constructed that it would not cover the entry to the tray. The back cover would be easily movable by hinges and quick locking bolts. Preferably, the entry and retrieval point where the back cover is to be moved out of the way would be the entry point for the vendor or courier to use, as opposed to the customer.

According to still another embodiment an entry and retrieval point may locate on a terminal wall that is perpendicularly in relation to the vertical lift cage structures (also called vertical end structures) (303). In such case the back cover (216) would again prevent the user to reach sideways beyond the back cover.

The second important function of the back cover is to support parcel trays in the shelf column. FIGS. 10A-D illustrate this. When the extender plate (305) moves outward from the lift cage (300) toward the shelf column in order to allow the loader to reach a tray on the shelf column, a vertical edge of the back cover (216a) becomes pushed against a tray that is just above the one that the loader is reaching to (see FIG. 10C). As the loading rollers (208) rotate and become in contact with the toothed engagement rack (102b) the designated parcel tray becomes loaded onto the loader (FIG. 10C-D), the edge of the back cover (216a) holds the upper tray in place—i.e. prevents it from moving along with the one that is pulled by the loader. When loading movement is completed, the extender plate moves back to inside the lift cage and the edge of the back cover is also moved away from the upper tray. This functionality helps to avoid situations where originally tightly backed goods force their packaging open, expand, press against an upper parcel tray and drag the upper tray and its parcels into the loading area (412) and cause malfunctioning of the parcel terminal. This functionality, even if seemingly minor, is essential to keep the shelf columns and trays on the racks fully lined so that the terminal can be used with maximal efficiency and trays can be retrieved and loaded from the shelf columns hundreds of times without deteriorating the system. This also allows packing the trays relatively full. Depending on the size and/or weight of the parcels on the trays inserted in the shelf column, the back cover (216) can stabilize the shelving unit such that multiple parcel trays above the designated parcel tray are secured by the edge of the back cover (216a). According to one preferred embodiment up to 12 parcel trays that are located above the designated parcel tray are secured, although, in general it is necessary to secure only the tray that is located directly above the designated tray.

Figure 4:
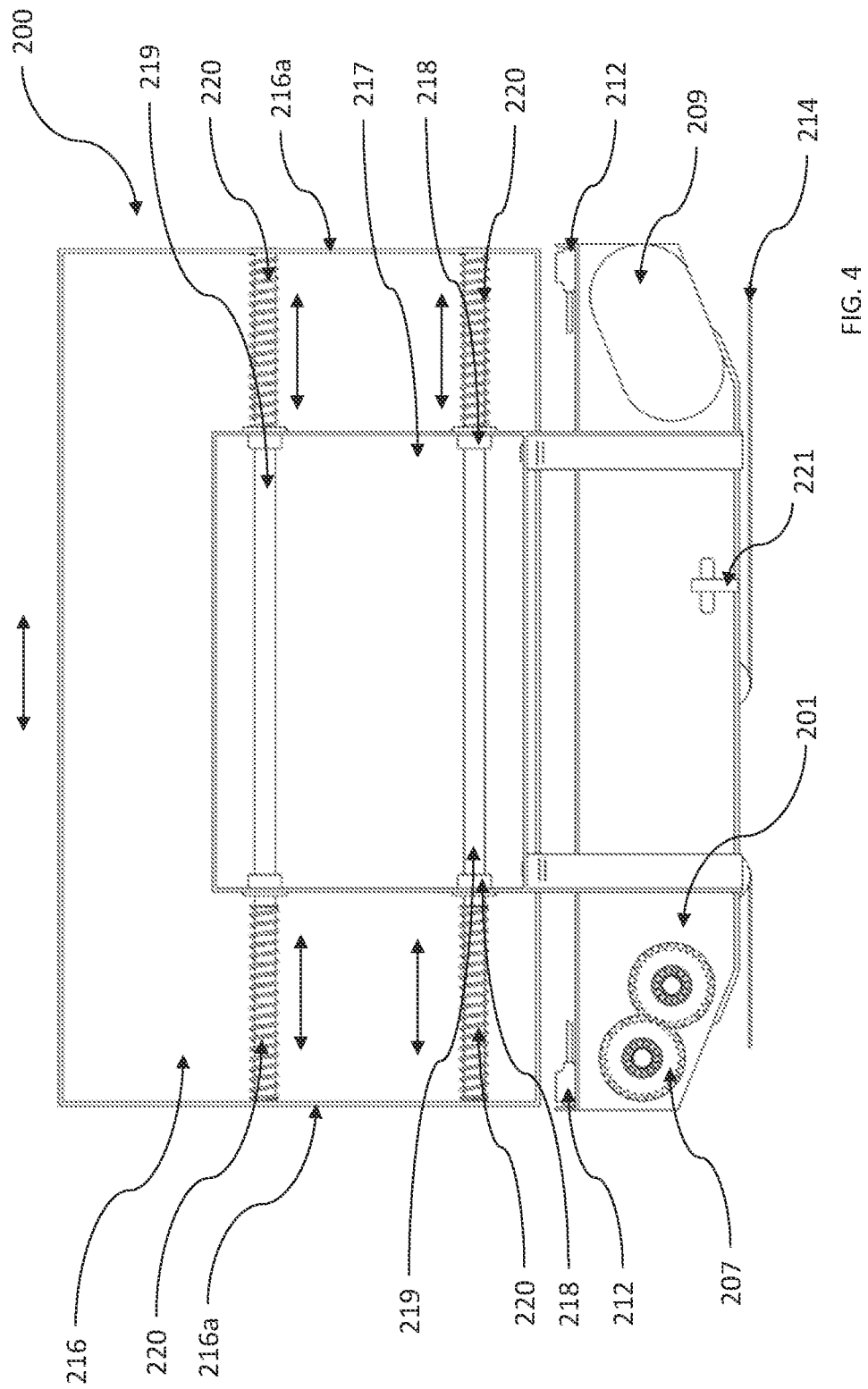
FIG. 4 illustrates a side view of the loader (200) and the back cover (216). In this embodiment the back cover is dynamically attached to the back cover support. The figure shows the gear system (207) at one end of the loader main structure (201). The figure shows a gear cover (209) covering the gear system at the other end of the loader main structure (201). Optical sensors (212) are shown in both ends of the main structure. Extender timing belt (214), back cover edges (216a), back cover support (217), sliding bushings (218) on the support shafts (219), compression springs (220), and a loader home sensor (221) are shown in the figure.

Referring to FIG. 4, an embodiment is shown where the back cover (216) is connected to a back-cover support (217) through sliding bushings (218) and support shafts (219). Two sets of compression springs (220) are placed between the back cover and back cover support. The back cover has a width similar to the main structure of the loader and without external load the springs balance the back cover (216) exactly in the middle of the loader; i.e. the back cover edges are lineated with the open ends of the main structure of the loader (shown in FIG. 10A). The springs allow, however, the back cover to move from side to side (toward the open ends of the main structure of the loader) when external force is applied, e.g. when the back cover comes to contact with the trays in the shelf column (See FIGS. 10B and C). The feature is necessary to enable the loader (200) to move towards the shelf columns or the inner console, without the back cover obstructing the movement, and allowing the loading rollers (208) to come in contact with the parcel tray (100) and facilitate the tray loading action.

In an alternative embodiment it is possible to replace the purely mechanical system described above with a motorized solution in order to use the back cover (216) to push dislocated parcel trays in the shelf columns back into their position. This can occur for example after earthquakes or other outer shocks to the parcel terminal that have caused the trays to move out from their position in the shelf columns.

Figure 3B:
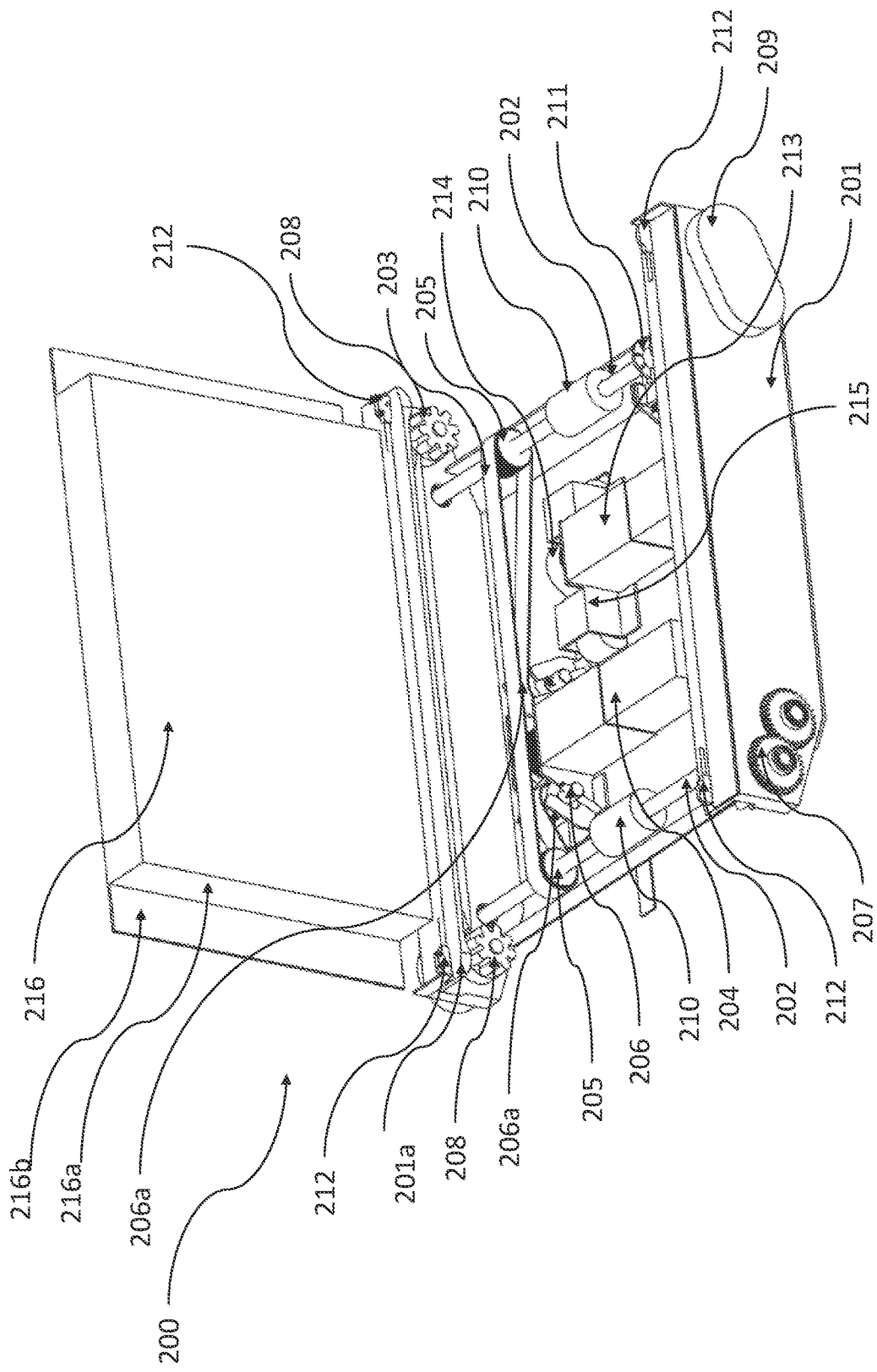
FIG. 3b. illustrates one embodiment of the structure of the loader. In this embodiment the back cover (216) is fixed on the back cover support (217) stationarily. The back cover has a back cover edge (216a) and a back cover protection edge (216b). The back cover has a back cover edge and a back cover protection edge symmetrically on both of its ends to be functional for serving shelf rows on both sides of the loader.

In another embodiment as shown in FIG. 3b the back cover is stationarily fixed onto the back cover support (217). The back cover has a vertical back cover edge (216a) located closer to the center of the loader (200) and a protection edge (216b) extending further to the end of the side of the loader. Each end of the back cover has both the back cover edge and the protection edge. When the extender plate (305) moves outward from the lift cage (300) toward the shelf column, the vertical edge of the back cover (216a) becomes pushed against at least one tray that is above the tray that the loader is reaching to (i.e., the tray that is intended to be pulled onto the loader). In this embodiment the protection edge (216b) slides along a side of at least one tray above the tray intended to be loaded on the loader and facilitating the loading rollers (208) coming in contact with the toothed engagement rack (102b) and start the loading procedure. The protection edge (216b) is necessary to prevent users reaching sideways beyond the back cover (216).

A loader home sensor (221) is fixed onto the outer side of the main structure (201).

Lift and Extender

Referring specifically to FIG. 5, the lift-structure of this parcel terminal comprises a lift cage (300) that comprises two vertical end structures (303) and preferably two supporting horizontal elements (303a) connecting the vertical end structures. The loader is configured to move in the lift cage between the two vertical end structures (303). According to a preferred embodiment the lift cage has a width (measure between the vertical end elements) that is three times the width of the loader (200). The loader on the other hand has a width that is the same as the width of a shelf column and the width of the inner console. This way the lift cage (300) in a preferred embodiment has a width that equals to width of three shelf columns in the terminal and the loader can be positioned in three positions in the lift cage where the three positions equal to location of the loader to be in front of either one of the three shelf columns on one side of the lift cage. Thus, when there are two shelf rows, one in each side of the lift cage, the lift cage serves all together six shelf columns in this embodiment. If the terminal has only one shelf row the lift cage having a width of three self-columns serves three shelf columns. It is to be understood that the width of the lift cage can equal to any number of shelf columns and that the width of the lift cage effects on how many shelf columns the lift cage can serve. In preferred embodiments the width of the lift cage is two or three shelf columns.

According to certain embodiments the inner console may locate within a shelf column and in such case one of the positions of the loader on the lift cage would allow positioning the loader in front of the inner console.

The lift cage (300) moves up and down along lift rails (401) in a corridor between the parallel shelf rows, or in front of one shelf row, guided by rollers (301a) on one side and guide buffers (301b) on the other side. The rollers can be adjusted in horizontal plane to compensate for the manufacturing tolerances and ensure that the lift runs smoothly and is guided properly along the entire length of the rail. The lifting force is applied to the lift cage through one or more lift belts (403), which are connected from one of their ends to fixing plates (302). The fixing plates are located on the upper horizontal element (303a). One of the plates is stationary while the other can be adjusted in the vertical direction to level the entire lift cage in the horizontal plane. Counterweights (404) are attached to the other ends of the lifting belts (403). In a preferred embodiment the number of counterweights is two, however other alternatives from one to larger numbers are possible, depending on the size of the parcel terminal. The total mass of the counterweights equals that of the mass of the lift cage and loader assembly to balance the system and use less power for lifting actions. The counterweights are guided by counterweight rails (405) on the shelf columns (402).

The rollers (301a), buffers (301b) and plates (302) are supported by the lift-cage (300), which also carries a pair of loader positioning slides (304). These enable to position the loader in front of the designated shelf column and connect to the extender plate (305). The extender plate is located underneath the loader. Timing belt (306) is connected to the extender plate (305) at the bottom and once torque is applied to the positioner drive pulley (307) through positioner motor (308), the extender plate along with the loader on top of it is moved to a desired position. The timing belt (306) loops around the drive pulley (307) on one end and an idler pulley (309) at the other end.

Extender slides (310) connect the extender plate (305) to the loader (200) and enable to position the loader into on- or off-loading position (on-position being a position where the loader becomes in connection with a tray on the shelf column or a tray on the loader becomes in connection with shelf column) through timing belt (214) and extender motor (213). Extender timing belt is connected to the extender plate with plates (307), which are also used to tension the belt into a desired pre-stress to ensure proper operation of the system.

The lifting and lowering movements of the lift cage are enabled by the lift motor (406) and drive pulley (407). The torque is transferred from the drive pulley to a lifting shaft system (408) through an endless (loop) timing belt (409). Once torque is applied to the motor and the drive pulley (407) rotates, the lift moves up and counterweights down or vice versa.

Internal Structure of the Terminal

Referring to FIG. 6, internal structure of the terminal comprises shelf supports (402a), that from shelf columns (402) to provide support for parcel trays (100) on which parcels and goods can be stored. The shelf supports are joined together by ceiling profiles (410) and shaft supports (411).

In a preferred embodiment the shelf columns form two parallel rows inside the parcel terminal and a loading area (412) without shelf columns is formed perpendicularly to the shelf column rows. The lift cage is moving vertically in between the shelf rows. In an alternative embodiment, shelf columns can form one row inside the parcel terminal and leave a section for the lift cage on one side of the parcel terminal. The external console (502) can be located perpendicular to the shelf columns at one end of the loading area or two external consoles can be located at either ends of the loading area perpendicular to the shelf columns. Lift home sensor (413) is placed underneath the external console.

Internal Console

Referring now to FIG. 7, the internal console (500) of the parcel terminal enables placement and retrieval of parcels. In a preferred embodiment the internal console comprises a support structure (501) to which a pair of light curtains (502) are attached. These are used to ensure that the terminal will not facilitate any movements in case an object, such as a hand of the customer, is obstructing the curtains. The curtains are additionally used to register retrieval and placement of parcels by registering a placement or retrieval event in case something passes through the curtains. The curtains are operational while the console sliding door (503) is open. The console sliding door is operated by a door belt (504) and door motor (505) with attached pulley system (506). The signal from light curtains (502) cuts the power to the door motor and stops the movement of the door in case an object is in between the curtains. The sliding door (503) moves along the guide rails (507). There is a door home sensor (508) to register the closed state of the door to enable to switch off the light curtains.

A pair of vertical measurement curtains (509) is located at the back of the internal console. The measurement curtains register the height of the parcel when it is pulled on a tray into the machine. The measurement curtains send information to the computer where the calculation of suitable vacant space on the shelves of the terminal is performed. The height measurements enable the computerized system to calculate and distribute the received parcels inside the terminal in most optimal manner. Optical sensors (510) are placed at the ends of the internal console. These sensors detect oversize while the parcel is being pulled into the terminal from the internal console. If any oversize is detected, the parcel tray is pushed back into the internal console.

The counter (511) of the internal console on top of the sliding door is made from high surface hardness material such as brushed stainless steel or anodized aluminum to ensure good resistance to scratches that can occur during parcel handling.

A set of cover plates (512) are placed at both sides of the internal console, which form a closed space together with the back cover (216) when the loader is in the console. This enclosed space is essential to ensure that neither the courier/vendor nor the customer/client have access to the internal parts of the terminal.

In an alternative embodiment the automatic door system can be replaced with a hatch, counterweight system and two electromagnetic locks. Once the parcel has been brought into the internal console an upper electromagnetic lock opens and light or sound signal is given to the user. User can manually open the door and lower electromagnetic lock locks the door into its lower position. User can then insert or retrieve parcels from or onto the parcel tray. Once the insertion or retrieval is completed the lower electromagnetic lock opens and door is moved upwards from the force of the counterweight until the upper electromagnetic lock closes.

Outer Shell and External Console

Referring to FIG. 8, the outer shell is composed of interlocking sheet metal panels (601) which are fixed onto the shelf columns and outer frames. The pitch of the sheet metal panels matches the pitch of the shelf columns, thus enabling easy modularization of the parcel terminals length. The panels can be covered as desired, e.g., different color choices, advertisement areas etc. The panels cover the parcel terminal from all four sides and from above. In a preferred embodiment the panels include sealing and insulating materials to enable the parcel terminal to be placed partially or fully in the outer environment. Furthermore, in the described embodiment a temperature and moisture control device shall be placed on the roof of the parcel terminal. In an alternative embodiment, the sealing and insulation elements and the temperature control device can be excluded to offer a more cost-effective solution for indoor environments.

The external console (502) is located in the loading area (412) at one end of the parcel terminal. The external console comprises a user interface (603). According to a preferred embodiment the external console comprises a hatch, touch screen, a scanner, payment terminal and an ADA (Americans with Disabilities Act)-compliant headphone jack with a volume control button. In an alternative embodiment a second external console with duplicating or reduced equipment can be located at the opposite end of the parcel terminal. One side would be utilized by couriers for parcel entry and other side by clients for parcel retrieval. This embodiment allows to optimize the logistics around the terminal, as the parcels could be entered directly from the warehouse, which in other cases would not be possible and would require the courier to exit the warehouse in order to load from the customer facing console. According to certain embodiments the external consoles may locate on two adjacent walls of the terminal.

Loading or Unloading Functional Description

Lift cage (300) is moved to a designated height so that the support surfaces (102b) of a parcel tray (100) are at the same height as the bases of the guide rails (201a). Loader (200) is moved within the lift cage (300) to a designated horizontal position in front of the parcel tray so that the engagement racks (102a) are aligned with the loading rollers (208). Extender motor (213) moves the loader forward so that the loading rollers (209) nearest to the parcel tray come in contact with the engagement racks (102a) of the parcel tray. At the same time, the back-cover edge (216a) comes in contact with the parcel tray located above the designated parcel tray. As the extender plate (305) moves forward, the back cover (216) remains stationary/moves relatively backward while the springs (220) are being compressed on one side and elongated on the other side.

According to certain embodiment, the back cover does not have the spring system, but the back cover is stationarily fixed onto the back cover support. The back cover has a vertical back cover edge (216a) located closer to the center of the loader (200) and a protection edge (216b) extending further to the end of the side of the loader. Each end of the back cover has both the back cover edge and the protection edge. When the extender plate (305) moves outward from the lift cage (300) toward the shelf column, the vertical edge of the back cover (216a) becomes pushed against at least one tray that is above the tray that the loader is reaching to (i.e. the tray that is intended to be pulled onto the loader). In this embodiment the protection edge (216b) slides along a side of at least one tray above the tray intended to be loaded on the loader and facilitating the loading rollers (208) coming in contact with the toothed engagement rack (102b) and start the loading procedure. The protection edge (216b) is necessary to prevent users reaching sideways beyond the back cover (216).

Once the front optical sensors (212) detect an edge of the parcel tray, movement of the extender plate is stopped and loading rollers start to rotate and drag the parcel tray onto the loader along the guide rails (210a) until the back optical sensors (212) also detect an edge of the parcel tray. The required number of rotations is also observed by the encoder system (211) in connection with the computer system of the terminal to facilitate proper loading sequence even in case one pair of optical sensors (212) fail and to facilitate a loading with varying speed profiles. This enables to load the tray slower in the beginning and faster in the middle section, which leads to a faster loading time. Edge of the back-cover (216a) remains engaged with the edge of the upper tray and holds it in place, in case parcel (20) on the designated parcel tray has opened or otherwise has moved and tries to pull the upper tray into the loading area (412). A counter profile in the guide rail groove (201b) forces the parcel tray's edge down in the first steps of tray loading, making sure that the engagement rack and loading roller teeth are properly engaged.

Once both pairs of optical sensors detect the parcel tray edge, roller movement is stopped, and extender plate moves the loader back to its central position i.e. into a position where the loader is completely inside the lift cage. At the same time, the two pairs of compression springs passively move the back cover back to its central position. As a result, the tray and back cover are in a central position on the loader and the loader is in central position inside the lift cage.

For unloading the sequence of the steps is reversed.

Weight Verification Function

In general, there is weight limitation to parcels that can be placed into parcel terminals in order not to overload the mechanical and electrical systems. In the particular embodiment a weight limitation functionality has been incorporated into the terminal's control unit. When a parcel has been loaded onto the parcel tray and console hatch or the automatic door has been closed, lift cage will move the loader upward a designated distance at a slow speed and acceleration. During this movement, the current from the motor is recorded and compared against a previously set threshold. As the motor current is proportional to the applied torque and therefore the weight to be moved, the parcel weight can be derived. In case the placed parcel exceeds a given weight limit the threshold would be exceeded and a signal would be given to the user to remove the parcel due to overweight. As the lift cage is moved at a slower speed during the measurement, the danger to mechanical and electrical systems is greatly reduced as the resulting loads are also proportional to the acceleration of the system. This feature both ensures the safety of the system but also enables to build the mechanical and electrical systems with lower strength reserves to reduce the cost of the terminal. In an alternative embodiment the weight verification function is facilitated by recording the motor current of the positioner motor.

Example Case 1 Customer/Client Use (Automatic Door)

Client enters to the external console. Client touches the display, and the display becomes active. Client scans or enters the order number. Upon receiving the order number, the lift cage, and the positioner (as meant here this term includes positioner timing belt, positioner drive pulley and positioner motor) move the loader in front of the parcel tray that contains client's goods. The extender plate moves the loader sideways outward from the lift cage toward the designated tray to allow contact of the loading rollers with the engagement racks of the parcel tray. Loading rollers engage with the parcel tray and pull the tray onto the loader. Extender plate moves the loader back into the lift cage. Lift cage moves to the level of the internal console and the positioner moves the loader within the lift cage to positions where it faces the internal console. The positioner moves the loader into the internal console. The light curtains are activated, and the door motor starts to open the console door. In case the client places an object between the light curtains, the door movement is stopped. When the door reaches the lowest position, the light curtains are inactivated. Client can now retrieve the goods from the parcel tray. Once the goods have been removed or certain time has passed the door motor starts to close the door and the light curtains are activated. Once the door reaches the closed position, the light curtains are inactivated. Lift, positioner, extender plate and rollers store the parcel tray at a designated spot and return to idle position.

Example Case 1 Customer/Client Use (Manual Door)

Client enters to the external console. Client touches the display, and the display becomes active. Client scans or enters the order number. Upon receiving the order number, the lift-cage and positioner move the loader in front of the parcel tray that contains client's goods. The extender plate moves the loader sideways in the lift cage to a position where the loading rollers are in contact with the engagement racks of a parcel tray. Loading rollers engage with the engagement racks of the parcel tray and pull the tray onto the loader. Extender plate moves the loader back into the lift cage. Lift cage moves vertically such that the loader is at the level of the internal console and the positioner moves the loader outward from the lift cage into the internal console. The lock that holds the door in closed position is opened and the display indicates that the client can open the external console hatch. Client opens the external console hatch which locks into the open position with a second lock. Client can now retrieve the goods from the parcel tray. Once the goods have been removed or certain time has passed the console hatch lock will open and the door will slide up and lock into a closed position. Lift, positioner, extender plate, and rollers store the parcel tray at a designated spot and return to idle position.

Example Case 2 Courier Use (Automatic Door)

Courier enters to the external console. Courier touches the display and the display becomes active. Courier identifies himself and then scans the barcode or enters the order number on a pin pad. Upon receiving the order number, the lift cage and the positioner move the loader in front of an empty parcel tray. The extender plate moves the loader within the lift case such that the loading rollers contact the engagement racks of the trays. Rollers engage with the parcel tray and pull the tray onto the loader. Extender plate moves the loader back to the lift cage. Lift cage and positioner move the loader into the internal console. The light curtains are activated, and the door motor starts to open the console door. In case the courier places an object between the light curtains, the door movement is stopped. When the door reaches the lowest position, the light curtains are inactivated. Courier loads the goods onto a parcel tray. Once the goods have been loaded the door motor starts to close the door and the light curtains are activated. Once the door reaches the closed position, the light curtains are inactivated. Lift cage raises the loader a small distance to verify the load on the lift motor to ensure that the placed parcel is not over the weight limit. In case weight limit is not exceeded the lift, positioner, extender plate and rollers cooperate to store the parcel tray at a designated spot. During loading, the tray will pass through measurement curtains where its height is measured so it could be stored into an optimal spot in the machine. Additionally, the tray passes through a pair of optical sensors to verify that no part of the parcel is overhanging from the parcel tray. The process is repeated until all parcels have been inserted into the machine. The lift, positioner, extender, and rollers store the last parcel and return to idle position.

Example Case 2 Courier Use (Manual Door)

Courier enters to the external console. Courier touches the display, and the display becomes active. Courier identifies himself and then scans the barcode or enters the order number on a pin pad. Upon receiving the order number, the lift and positioner move the loader in front of an empty parcel tray. The extender plate moves the loader sideways within the lift cage such that the loading rollers are in a contact with a parcel tray. Rollers engage with the parcel tray and pull the tray onto the loader. Extender plate moves the loader back to the lift cage. Lift cage and positioner move the loader into the internal console. The lock that holds the door in closed position is opened and the display indicates that the courier can open the external console hatch. Courier opens the external console hatch which locks into the open position with a second lock. Courier loads the goods onto a parcel tray. Lift cage raises the loader a small distance to verify the load on the lift motor to ensure that the placed parcel is not over the weight limit. In case weight limit is not exceeded the lift, positioner, extender, and rollers store the parcel tray at a designated spot. During loading, the tray will pass through measurement curtains where its height is measured so it could be stored into an optimal spot in the machine. The process is repeated until all parcels have been inserted into the machine. After which the courier ends the session or a certain time passes and the console hatch lock opens, and the door slides up and locks into a closed position. Closing the door only at the end of the loading session in case of a courier facilitates faster loading of the machine. The lift cage, positioner, extender plate, and rollers store the last parcel and return to idle position.

Example Case 3 (Courier Use) (Automatic Door)

Courier enters to the external console in the warehouse area and logs into the machine from a pin pad. Courier enters the order number on the pin pad and lift cage, positioner, extender plate and rollers act and bring an empty parcel tray into the internal console. The light curtains are activated, and the door motor starts to open the console door. In case the courier places an object between the light curtains, the door movement is stopped. When the door reaches the lowest position, the light curtains are inactivated. The courier moves the back cover out of the way and loads the goods onto a parcel tray. Once the goods have been loaded, the courier moves the back cover back into its position. The door motor starts to close the door and the light curtains are activated. Once the door reaches the closed position, the light curtains are inactivated. Courier loads the goods onto a parcel tray. Once the goods have been loaded the door motor starts to close the door and the light curtains are activated. Once the door reaches the closed position, the light curtains are inactivated. Lift cage raises the loader a small distance to verify the load on the lift motor to ensure that the placed parcel is not over the weight limit. In case weight limit is not exceeded the lift cage, positioner, extender plate and rollers store the parcel tray at a designated spot. The process is repeated until all parcels have been inserted into the machine or a client logs in from a second console in a client area. In case a client logs in, the courier session is paused only when the back cover has been moved back into its position and the courier console door is closed.

Example Case 3 (Courier Use) (Manual Door)

Courier enters to the external console in the warehouse area and logs into the machine from a pin pad. Courier enters the order number on the pin pad and lift cage, positioner, extender plate, and rollers act and bring an empty parcel tray into the internal console. The lock that holds the door in closed position is opened and sound signals and light indicate that the courier can open the external console hatch. Courier opens the external console hatch which locks into the open position with a second lock. The courier moves the back cover out of the way and loads the goods onto a parcel tray. Once the goods have been loaded, the courier moves the back cover back into its position. Lift cage, positioner, extender plate and rollers cooperate to store the parcel tray at a designated spot. The process is repeated until all parcels have been inserted into the machine or a client logs in from a second console in a client area. In case a client logs in, the courier session is paused, and the console hatch lock opens, and door slides up and locks into a closed position.

Example Case 4 Customer/Client Use (Automatic Door)

Client enters to the external console. Client touches the display, and the display becomes active. Client uses the display to procure goods that have been preloaded into the parcel terminal. Once the client has confirmed the wish to procure the goods, a payment request is sent to the payment terminal located on the external console of the parcel terminal. Client uses the payment terminal to pay for the goods and once payment is confirmed, a signal is sent to the parcel terminal controller and lift cage, positioner, extender plate and rollers act and bring a parcel tray with the procured item to the internal console. The light curtains are activated, and the door motor starts to open the console door. In case the client places an object between the light curtains, the door movement is stopped. When the door reaches the lowest position, the light curtains are inactivated.

Client can now retrieve the goods from the parcel tray. Once the goods have been removed or certain time has passed the door motor starts to close the door and the light curtains are activated. Once the door reaches the closed position, the light curtains are inactivated. Lift cage, positioner, extender plate and rollers cooperate to store the parcel tray at a designated spot and return to idle position. In case a client procured multiple goods stored on multiple parcel trays, the process of bringing the parcel tray with goods and removing the goods is repeated until all procured goods have been received by the client. After the client's session has ended the parcel terminal controller will send the parcel terminal owner information regarding the procured goods so these could be reloaded at next visit.

Example Case 4 Client/Customer Use (Manual Door)

Client walks to the external console. Client touches the display, and the display becomes active. Client uses the display to procure goods that have been preloaded into the parcel terminal. Once the client has confirmed the wish to procure the goods, a payment request is sent to the payment terminal located on the external console of the parcel terminal. Client uses the payment terminal to pay for the goods and once payment is confirmed, signal is sent to the parcel terminal controller and lift cage, positioner, extender plate, and rollers act and bring a parcel tray with the procured item to the internal console. The lock that holds the door in closed position is opened and the display indicates that the client can open the external console hatch. Client opens the external console hatch which locks into the open position with a second lock. Client can now retrieve the goods from the parcel tray. Once the goods have been removed or certain time has passed the console hatch lock will open and the door will slide up and lock into a closed position. Lift cage, positioner, extender plate, and rollers store the parcel tray at a designated spot and return to idle position. In case a client procured multiple goods stored on multiple parcel trays, the process of bringing the parcel tray with goods and removing the goods is repeated until all procured goods have been received by the client. After the client's session has ended the parcel terminal controller will send the parcel terminal owner information regarding the procured goods so these could be reloaded at next visit.

Example Case 5

The client procures an item in an online store and designates a specific store or parcel terminal for pickup. The seller is notified of the procurement and contents of the order via computerized system. A courier collects the ordered items in the warehouse of the designated store into a single packaged parcel and enters them into the parcel terminal through the external console located in the warehouse. Once the parcel is entered, a computerized system notifies the client via e-mail or text message that the order is now ready for pick-up and provides the client with a pick-up code. Simultaneously, the computerized system also notifies the seller that the specific order has been placed into the parcel terminal, so the parcel status could be tracked. Client walks to the external console located in the store area and uses the pick-up code to retrieve the parcel. Once the parcel has been retrieved from the terminal, the computerized system notifies the seller that the specific order has been picked up and therefore delivered to the client.

The parcel terminal may include computing hardware for carrying out the above-noted functionalities of FIGS. 11-14 and other functions, processes, steps, etc. of this disclosure. In one embodiment, the parcel terminal may include a first computing device, such as a general purpose computer having a computer-readable memory with instructions and a processor executing those instructions, that provides the user interface 603, effects communications with the server, and initiates commands to move the lift cage 300 and the loader 200, and other mechanical components of the terminal. The parcel terminal may further include a second computing device that controls movement of the lift cage, loader, and other mechanical components. The second computing device may receive movement commands from the first processing device and transmit movement instructions to the mechanical components. The second computing device may be a programmable logic controller (PLC), in an embodiment. The second computing device may also control opening and closing of the console doors, in an embodiment, responsive to input from the motion sensor, scanner, and/or first computing device. It should be noted that, although specific computing hardware is noted above for the first and second computing devices, any type of appropriate computing hardware may be used for any computing device in the parcel terminal, including but not limited to a general-purpose computer, a PLC, another programmable logic device (PLD), an application-specific integrated circuit (ASIC), etc. Further, it should be noted that functions, processes, steps, etc. of this disclosure that are carried out by such computing devices may be embodied in any combination of software, digital hardware, and analog hardware. Still further, although two computing devices are explicitly described above, it should be appreciated that the functions, processes, steps, etc. of this disclosure may be carried out by a single computing device, by two computing devices, or by more than two computing devices of the parcel terminal.

Element Listing

10—self-service parcel terminal
20—goods, parcels
100—parcel tray
101—tray base
102—tray sides extensions
102*a*—engagement rack
102*b*—support surface
102*c*—tapered ends
200—loader
201—main structure
201*a*—guide rail
201*b*—guide rail groove
202—loading shaft
203—loading belt
204—loading motor
205—timing pulley
206—belt adjustment system
206*a*—omega drive idler
207—gear system
208—loading roller
209—gear cover
210—clutch
211—encoder system
212—optical sensor
213—extender motor
214—extender timing belt
215—belt pre-stress system
216—back cover 216a—back cover edge
216b—back cover protection edge
217—back cover support
218—sliding bushing
219—support shaft
220—compression spring
221—loader home sensor
300—lift cage
301a—guide roller
301b—guide buffer
302—fixing plate
303—vertical lift cage structure (vertical end structure)
303a—horizontal element
304—loader positioning slides
305—extender plate
306—positioner timing belt
307—positioner drive pulley
308—positioner motor
309—idler pulley
310—extender sliders
400—internal structure
401—lift rail
402—shelf columns
402a—shelf support
403—lift belts
404—counterweight
405—counterweight rails
406—lift motor
407—drive pulley
408—lifting shaft system
409—endless timing belt
410—ceiling profile
411—shaft support
412—loading area
413—lift home sensor
500—internal console
501—support structure
502—light curtains
503—console sliding door
504—door belt
505—door motor
506—pulley system
507—guide rails
508—door home sensor
509—vertical measurement curtains
510—optical sensors
511—counter
512—cover plates
600—outer shell
601—sheet metal panels
602—external console
603—the user interface

What is claimed is:

1. An automated parcel terminal comprising:
at least one shelf row parallel to a wall of the terminal, the shelf row comprising multiple shelf columns;
at least one retrieval and entry point on a wall perpendicular to the at least one shelf row;
a lift cage configured to move vertically in front of the at least one shelf row, controlled by a lift-motor, lift driving belt, pulleys, and counterweights, and having a width equaling to a width of two or more shelf columns;
a loader being located on a movable extender plate positioned in the lift cage and the loader having at least one open end facing toward the at least one shelf row;
the loader and the extender plate being configured to move perpendicularly to the at least one shelf row inside the lift cage through operation of a positioner comprising a positioner motor, a positioner timing belt, and a positioner drive pulley, such that the loader and the extender plate can be positioned within the lift cage in front of a predetermined shelf column:
the extender plate configured to move toward the predetermined shelf column thereby moving the loader being located on the extender plate toward the predetermined shelf column such that the loader can push/pull a tray to/from the shelf column via a connection between toothed engagement racks in bottom side of the tray and toothed loading rollers located at the open ends of the loader, and wherein the at least one retrieval and entry point on a wall perpendicular to the at least shelf row is configured to provide access to retrieve or load trays directly onto the loader inside the lift cage.

2. The automated parcel terminal of claim 1, wherein the terminal has two parallel shelf rows and the lift cage has a width of three shelf columns and is located between the shelf rows, and the loader is configured to serve three shelf columns in each shelf row.

3. The automated parcel terminal of claim 1, wherein the terminal has two parallel shelf rows and the lift cage has a width of two shelf columns and is located between the shelf rows, and the loader is configured to serve two shelf columns in each shelf row.

4. The automated parcel terminal of claim 1, wherein the terminal has two retrieval and entry points on opposite walls of the terminal.

5. The automated parcel terminal of claim 1, wherein the terminal has a weight limitation functionality incorporated into a control unit of the terminal.

6. The automated parcel terminal of claim 1, wherein the loader has a vertical back cover perpendicularly positioned against the direction of the at least one shelf row, and the back cover is configured to form a barrier for a user to reach beyond a tray on the loader.

7. The automated parcel terminal 6, wherein the back cover has a back cover edge and a back cover protection edge, wherein the back cover edge is configured to prevent movement of one or more of the trays located in the shelf column above the tray intended to be loaded on the loader, while the back cover support edge extends along a side of the trays in the shelf column and enables loading rollers coming in contact with the toothed engagement rack and start the loading procedure.

8. The automated parcel terminal of claim 6, wherein the back cover comprises springs that allow the back cover to move horizontally when the loader reaches the tray to be pulled out from the shelf column.

9. A lift and loader-assembly for an automated parcel terminal comprising:
a lift cage having two vertical end structures connected by at least two horizontal elements, the lift cage configured to move vertically in front of shelf columns of the automated parcel terminal;
a positioner time belt running between the vertical end structures of the lift cage, the positioner time belt being attached to an extender plate supporting a loader and configured to move the extender plate and the loader horizontally within the lift cage between the two vertical end structures such that the loader becomes positioned in front of a shelf column to be served;

the loader comprising a loader main structure, two loading shafts connected by a loading belt, the loading shafts connected from each of their ends to a loading gear configured to roll loading rollers having toothed profile compatible with a toothing of an engagement rack underneath a tray; and the extender plate configured to move the loader toward the shelf column such that the loading rolls engage with the engagement rack of a tray for pulling the tray onto the loader; wherein the lift and loader-assembly is located in the parcel terminal such that at least one retrieval and entry point on a wall of the automated parcel terminal perpendicular to shelf rows of the automated parcel terminal provides an entry through one of the two vertical end structures directly to the tray on the loader when the extender plate and the loader are located adjacent to the one of the two vertical end structures.

10. The lift and loader-assembly for an automated parcel terminal according to claim 9, wherein the loader has a vertical back cover positioned parallel with the vertical end structures and locating on one side of the loader main structure.

11. The lift and loader-assembly for an automated parcel terminal according to claim 10, wherein the back cover has a back cover edge and a back cover protection edge, wherein the back cover edge is configured to prevent movement of one or more of the trays located in the shelf column above the tray intended to be loaded on the loader, while the back cover support edge extends along a side of the trays in the shelf column and enables loading rollers coming in contact with the toothed engagement rack and start the loading procedure.

12. The lift and loader-assembly for an automated parcel terminal according to claim 10, wherein the back cover comprises springs that allow the back cover to move horizontally when the loader reaches the tray to be pulled out from the shelf column.

13. The lift and loader-assembly for an automated parcel terminal according to claim 10, wherein the assembly has a weight limitation functionality operational during initial vertical movement of the lift after loading of the tray.

* * * * *